Feb. 24, 1931.  E. O. HASKINS  1,794,334
MOLDING APPARATUS
Filed July 17, 1928   7 Sheets-Sheet 1

Inventor
Elbert O. Haskins
by
his Attorney

Feb. 24, 1931.  E. O. HASKINS  1,794,334
MOLDING APPARATUS
Filed July 17, 1928  7 Sheets-Sheet 2
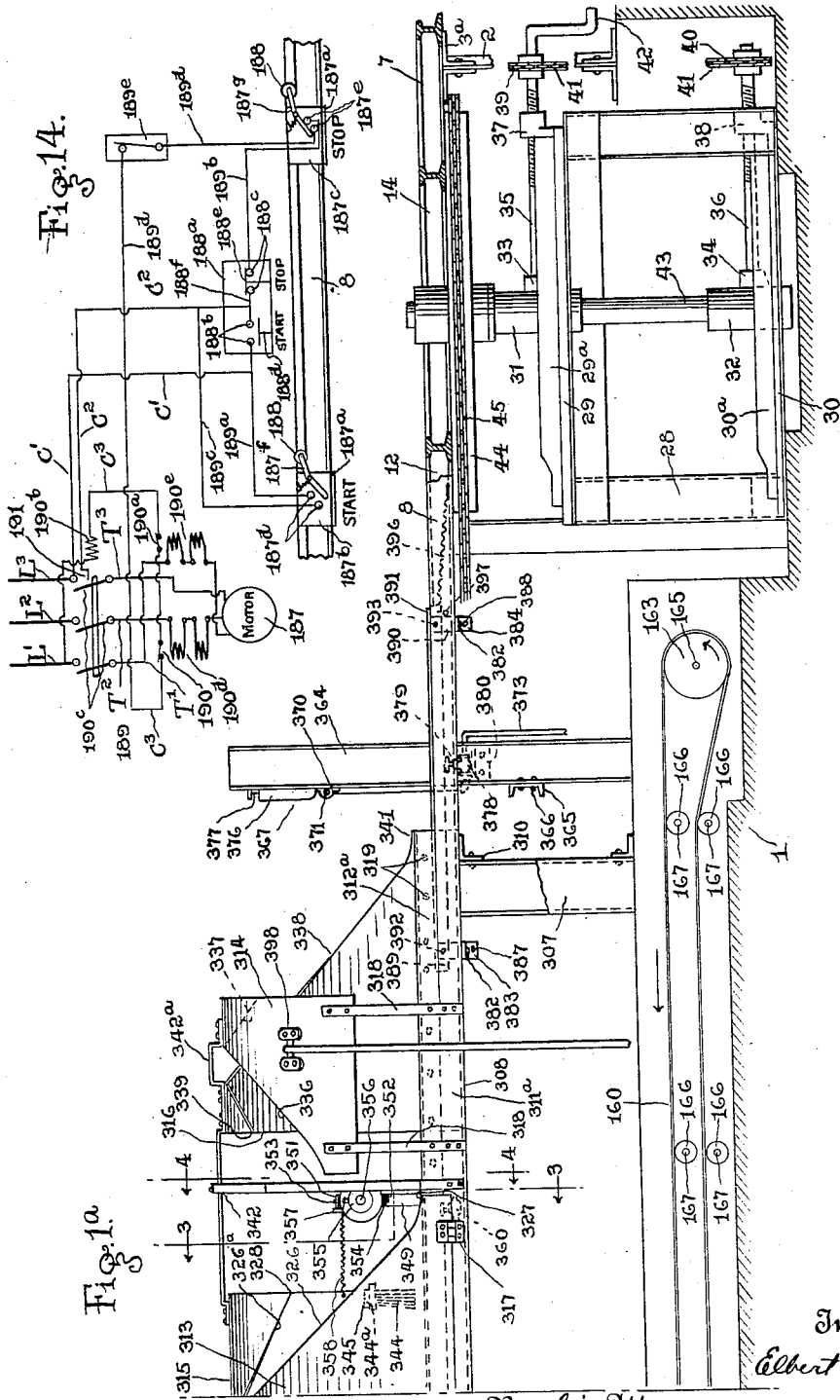
Inventor
Elbert O. Haskins
By his Attorney Feb. 24, 1931.   E. O. HASKINS   1,794,334
MOLDING APPARATUS
Filed July 17, 1928   7 Sheets-Sheet 3

Fig. 2.

Inventor
Elbert O. Haskins
By his Attorney

Feb. 24, 1931.  E. O. HASKINS  1,794,334
MOLDING APPARATUS
Filed July 17, 1928   7 Sheets-Sheet 4
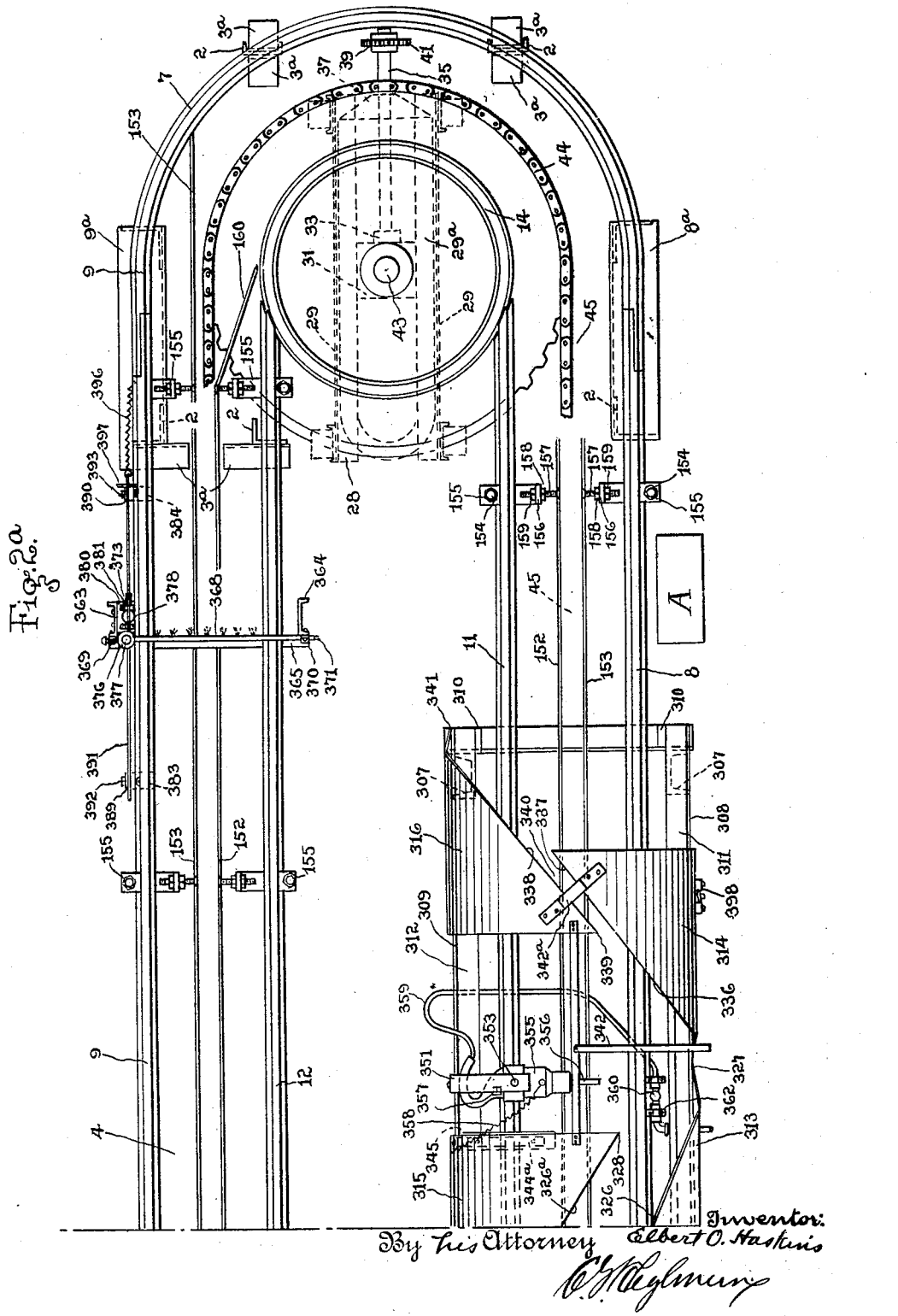

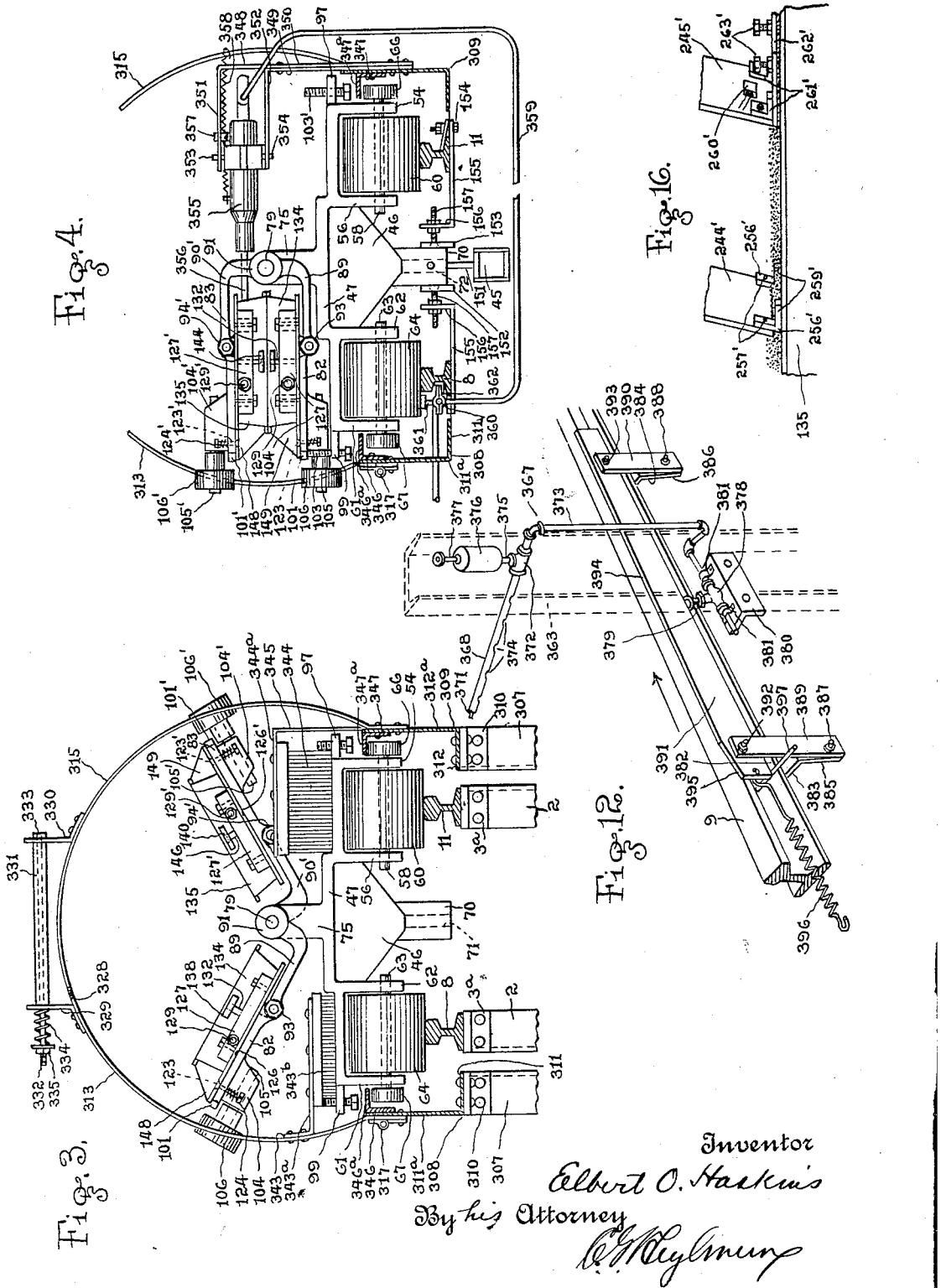

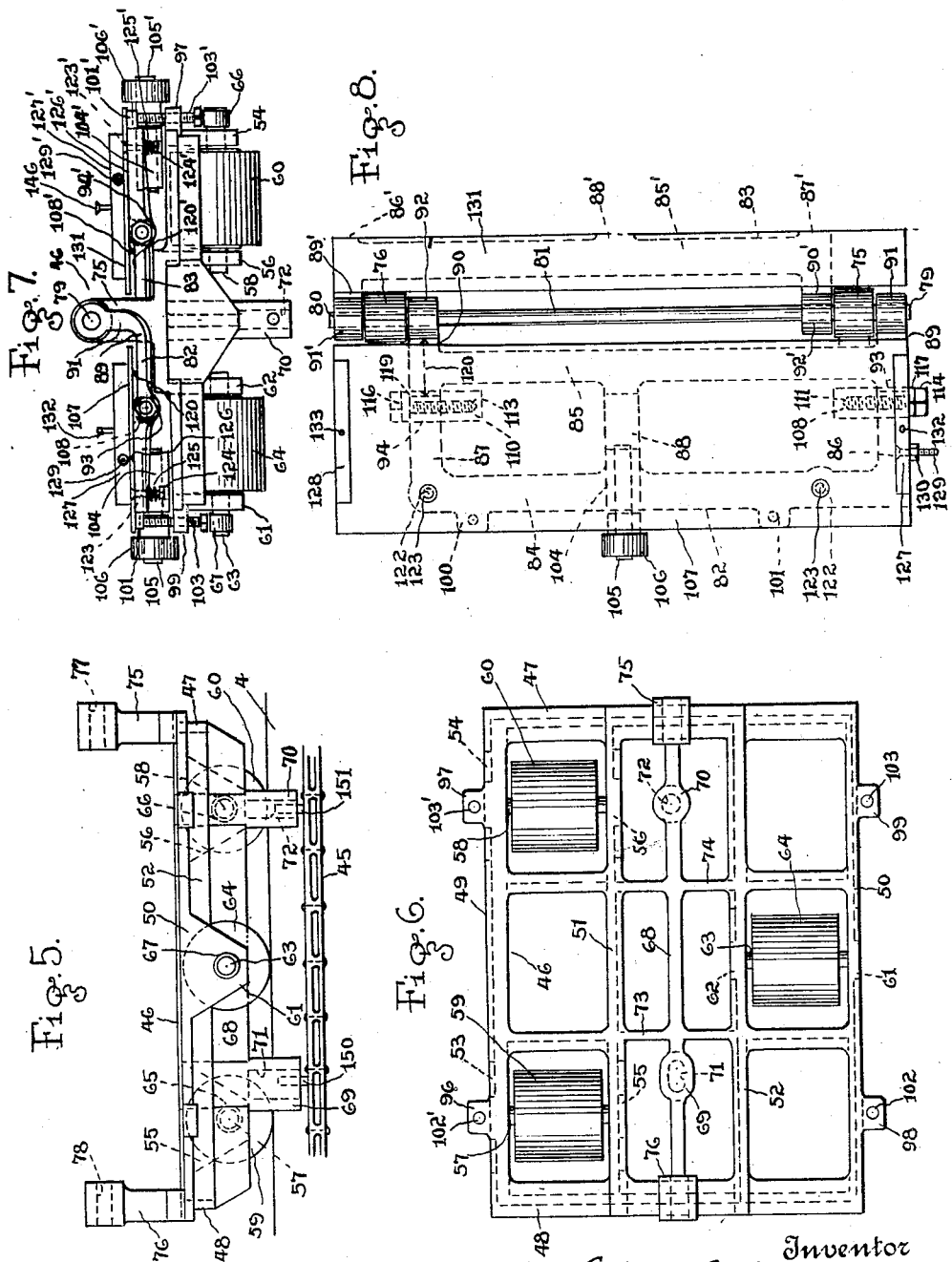

Feb. 24, 1931.  E. O. HASKINS  1,794,334
MOLDING APPARATUS
Filed July 17, 1928  7 Sheets-Sheet 7
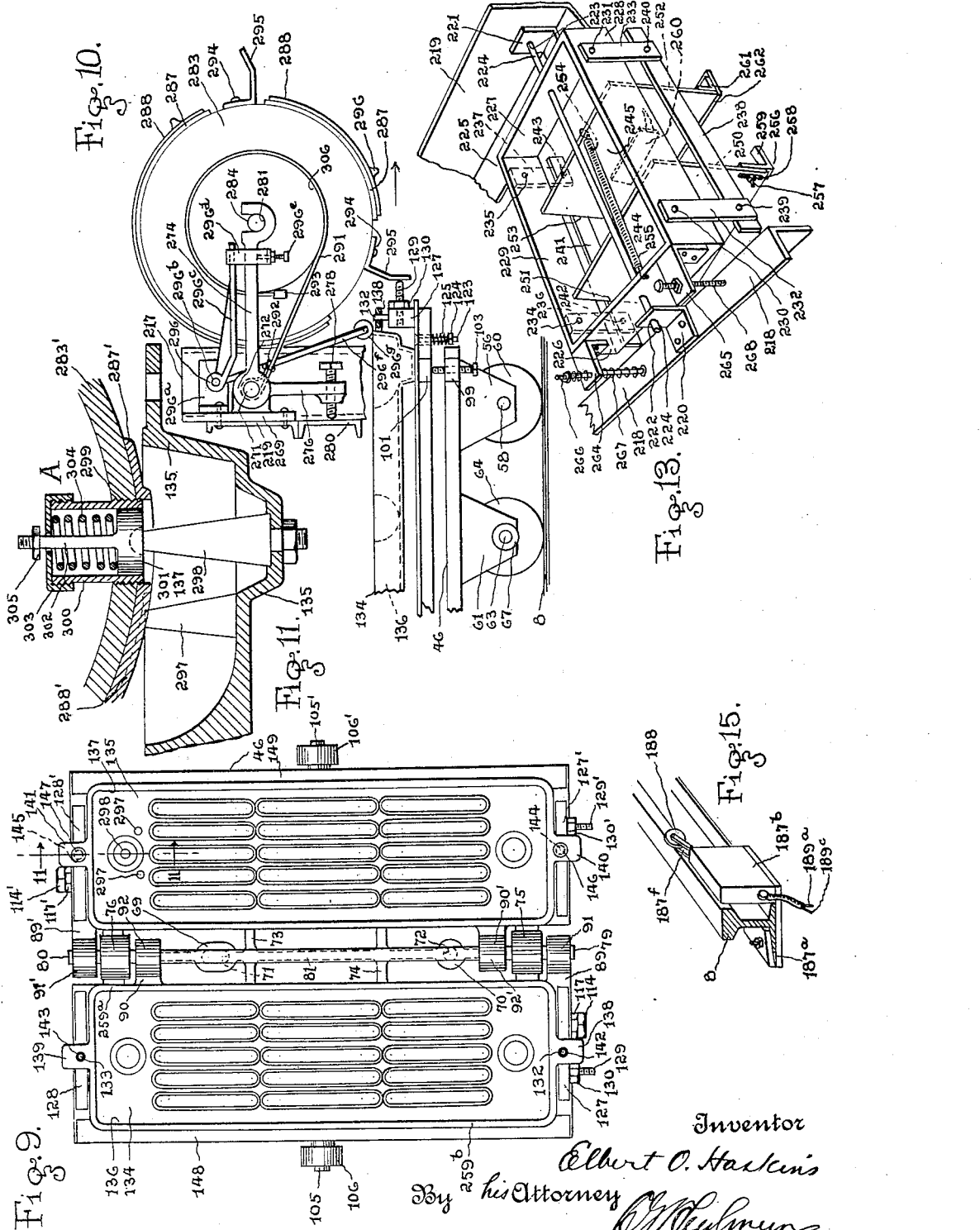

Patented Feb. 24, 1931

1,794,334

UNITED STATES PATENT OFFICE

ELBERT O. HASKINS, OF RUTHERFORD, NEW JERSEY, ASSIGNOR TO AMERICAN RADIATOR COMPANY, OF NEW YORK, N. Y., A CORPORATION OF NEW JERSEY

MOLDING APPARATUS

Application filed July 17, 1928. Serial No. 293,438.

My invention relates to new and useful improvements in molding apparatus, and more particularly to an apparatus for automatically forming a complete molded article or element.

An object of my invention is to provide an apparatus which in its cycle of operation will receive material to be molded, and will automatically form from the material a complete molded article or element.

Another object is to provide an apparatus which will efficiently assemble certain preformed parts to form a molded element.

Another object is to provide means, upon assembly of certain preformed parts of a complete article, to insure automatically complete bonding contact between the engaging surfaces of the parts over their entire bonding surfaces.

Other objects and advantages of my invention will appear more fully in the accompanying specification and claims.

The invention consists in the improved construction and combination of parts and their aggroupment in coperative relation, to be more fully described hereinafter and the novelty of which will be particularly pointed out and distinctly claimed.

In the accompanying drawings to be taken as a part of this specification, I have fully and clearly illustrated a preferred embodiment of my invention, in which drawings:

Figures 1 and 1ª together form a view in side elevation, partially in section, and with certain parts broken away, showing my molding apparatus;

Figs. 2 and 2ª together form a top plan view of my apparatus, certain mold material conveying means being removed for clarity of illustration;

Fig. 3 is a detail section on the line 3—3 of Fig. 1ª, but showing the mold carrying car advanced to one position in the assembly means;

Fig. 4 is a detail section on the line 4—4 of Fig. 1ª, but showing the mold carrying car advanced into another position in the assembly means;

Fig. 5 is a side elevation of a mold carrying car and its drive connection employed in my apparatus;

Fig. 6 is a plan view of the car or truck;

Fig. 7 is an end view of the car with certain mold supporting means mounted thereon;

Fig. 8 is a plan detail of the mold supporting means;

Fig. 9 is a plan view of the car with mold sections mounted thereon;

Fig. 10 is a detail side view of groove forming means embodied in my invention and showing a position of certain of the elements of my apparatus, and embodying certain slight modifications;

Fig. 11 is a detail vertical sectional view on the line 11—11 of Fig. 9 showing another position of certain of the elements;

Fig. 12 is a detail of certain cleaning means employed in my apparatus;

Fig. 13 is a detail in perspective of an element of my apparatus for removing excess mold material from the mold sections;

Fig. 14 is a diagrammatic view of a motor circuit embodied in my apparatus;

Fig. 15 is a detail of an electric switch utilized in the motor circuit, and

Fig. 16 is a detail side elevation of my material removing element shown in cooperative relation to a mold section.

Figure 1:
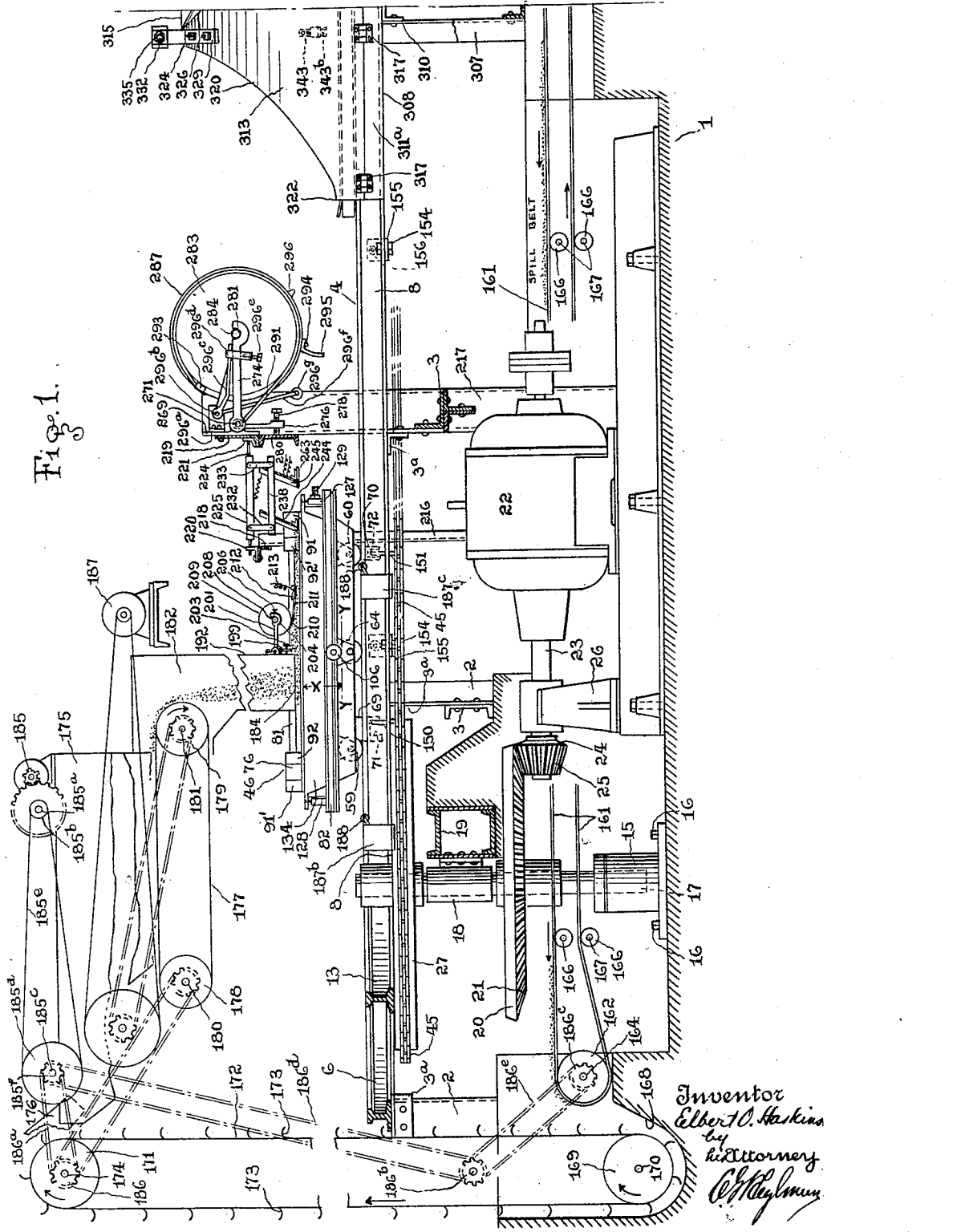

Referring to the drawings by characters of reference, 1 designates a supporting base or foundation on which is supported a superstructure comprising rigid columns 2 and cross-beams 3. Carried by angle brackets 3ª, fixed by rivets, or the like, to certain of the columns 2 and with one flange horizontal, is a two rail trackway 4, preferably endless and in the form of a loop. The outer rail 5 of the trackway 4 is substantially continuous, having semi-circular end rail portions 6, 7 joining straightaway side rail portions 8, 9. The inner rail 10 of the trackway 4 comprises straightaway side rail portions 11, 12 which are joined by circular end rail portions 13, 14 adapted to revolve, as will be described, which are within and concentric, respectively, with the end portions 6, 7. Concentric with the circular end rail portion 13 is a step bearing box 15 mounted on and rigidly secured to the foundation 1 by bolts, or the like, 16. Supported in this bearing box 15 is a vertical drive shaft 17 having intermediate its ends a bearing sleeve 18 rigidly secured, as by rivets, or the like, to a suitable cross-beam 19 fixed at its ends to the foundation 1, in any suitable manner. Also on the shaft 17, but fixed for rotation therewith, and positioned below the sleeve 18, is a gear wheel 20, preferably of the bevel gear type having gear teeth 21 on its under face. Mounted on the foundation 1 is a drive means 22, preferably an electric motor, having a drive shaft 23 on which is fixed a pinion 24, preferably of the bevel type having gear teeth 25 which mesh with the teeth 21 of gear wheel 20 to drive the shaft 17. The shaft 23 may be supported adjacent the pinion 24 by a journal bearing and block 26. Fixed on shaft 17 above the bearing sleeve 18 is a wheel 27, preferably of the sprocket type, having its upper face substantially in the plane of the supporting surfaces of the rail supporting angle-brackets 3ᵃ. The circular end rail portion 13 of the inner rail 10 is supported on and rigidly and concentrically fixed, in any suitable manner, to the upper face of the wheel 27 to turn therewith. Beneath the circular end rail portion 14 is a rectangular rigid framework 28 comprising upper and lower pairs of spaced guide rails 29 and 30, respectively, which extend longitudinally of the trackway 4. Slidably supported on the guide rails 29, 30 by slide bars 29ᵃ, 30ᵃ, are a journal bearing sleeve 31 and a step bearing box 32, respectively. The sleeve 31 and the box 32 are provided intermediate their ends with sockets 33, 34, respectively, in which are respectively secured adjustment shafts 35, 36 held against endwise movement relative to the sleeve and box, but having free rotation in said sockets. The shafts 35, 36 are externally threaded and extend through and in threaded engagement with internally threaded sleeves or nuts 37, 38 respectively, which are respectively fixed to the guide rails 29, 30. Fixed on the shafts 35, 36 beyond the nuts 37, 38 are sprocket wheels 39, 40 respectively, which are interconnected by a sprocket chain 41. The adjustment shaft 35 is provided with suitable actuating means, such as a crank 42 for manual adjustment of the sleeve 31 and box 32. Supported in the step bearing-box 32 is a vertical shaft 43 which extends upward through the bearing sleeve 31. Fixed on the upper free end of shaft 43 is a wheel 44, preferably of the sprocket type having its upper face substantially in the plane of the supporting surfaces of the rail supporting angle-irons 3ᵃ. The circular end rail portion 14 of the inner rail 10 is supported on and rigidly and concentrically fixed, in any suitable manner, to the upper faces of the wheel 44 to turn therewith. The wheels 27 and 44 are preferably of such diameter that their circumferences lie substantially in the center line of the trackway 4. Supported by the wheels 27 and 44 is an endless connecting member 45, which is driven by the wheel 27, and which is preferably a sprocket chain. The tension of the chain 45 may be adjusted by movement of shaft 43 longitudinally of the trackway by means of crank 42, and it will be apparent that the shaft 43 will be maintained in vertical position by means of the interconnected equally acting adjusting shafts 35, 36. The semi-circular rail portion 7 is joined to the straightway rail portions 8, 9 by extension joints 8ᵃ, 9ᵃ respectively, so that the rail portion 7 may be moved longitudinally of the trackway to maintain it concentric with the circular portion 14.

Adapted to travel on the trackway 4 is a car or truck 46, see Figs. 3 to 9 inclusive, which may be of cast or built-up construction, and which is preferably rectangular in plan outline having a front end frame member 47 and a rear end frame member 48 which are connected by side frame members 49, 50. Extending longitudinally of the car are frame members 51, 52, each of which is fixed at its ends to the end frame members 47, 48 respectively. Depending from the side frame member 49 are bearing brackets 53, 54 adjacent the ends of the car, and depending from the longitudinal frame member 51 opposite the brackets 53, 54 are bearing brackets 55, 56. Fixed in the brackets 53, 55 and brackets 54, 56 are shafts 57, 58 respectively, on which are journaled rail engaging wheels 59, 60 respectively. Substantially in the transverse center line of the car and depending from the side frame member 50 and the longitudinal frame member 52, are bearing brackets 61, 62 respectively, in which is fixed a shaft 63 on which is journaled a rail engaging wheel 64. The wheels 59, 60 and 64 are of substantially greater width than the rails of the trackway, as is evident from Fig. 3, to prevent the wheels leaving the rails, and also to permit the wheels to serve as actuating means, as will appear hereinafter. Each of the shafts 57, 58 and 63 extends outwardly beyond its outside bracket 53, 54 and 61 respectively, and has journaled on its projecting end a roller or sleeve designated 65, 66 and 67 respectively, for a purpose to be described. Also extending longitudinally of the car 46, substantially in the center line thereof, is a frame member 68 fixed at its ends to the end frame members 47, 48 respectively, and from which depend lugs 69, 70, having sockets or recesses 71, 72 respectively, in their bottom faces. Extending transversely of the car are frame members 73, 74, each having its ends secured respectively to the side frame members 49, 50, and being joined intermediate its ends to the longitudinal frame members 51, 52 and 68. On the front and rear end members 47, 48 and substantially in the longitudinal center line of the car 46, are alined bearing support members 75, 76 respectively, having alined openings 77, 78 therethrough respectively, through which extend the ends 79, 80 of a shaft 81. Positioned on the car in lateral relation are supporting means 82, 83, which are of similar construction but reversed on shaft 81, and therefore but one will be described in detail, the primes of the reference characters applied to the means 82 designating similar parts in the means 83. The supporting means 82 is preferably in the form of framework, which is substantially rectangular in plan outline, having longitudinal side ribs 84, 85 which are joined by transverse end ribs 86, 87, and an intermediate transverse rib 88. Projecting inwardly from rib 85 at its ends toward the longitudinal center line of the car, are arms 89, 90 from which rise, at substantially right angles to the plane of the frames 82, 83, bearing lugs 91, 92 which are journaled on the shaft 81 adjacent members 75, 76 respectively. The transverse ribs 86, 87 have on their undersides depending lugs 93, 94 respectively, through each of which is an internally threaded opening, said openings being in longitudinal alinement, for a purpose to be described. Projecting laterally outward from the side frame members 49, 50 are spaced lugs 96, 97 and 98, 99 respectively. Projecting laterally outward from the longitudinal side rib 84 of the supporting means 82, are spaced lugs 100, 101, which are vertically alined with lugs 98, 99. Threaded through the lugs 98, 99 are vertical adjusting bolts 102, 103 respectively, the upper ends of which are adapted to contact the under faces of the lugs 100, 101 respectively, so that the frame 82 may be raised or lowered about the shaft 81. Midway of the car longitudinally, are bosses 104, 104' on the under faces and at the outer longitudinal side edges of the frames 82, 83. Secured in the bosses 104, 104' are shafts 105, 105' respectively, which project laterally beyond the sides of the car, and journaled on the free ends of the shafts 105, 105' are operating means comprising cam rollers 106, 106' respectively, for a purpose to be described. Carried by the frame 82 is a plate member or platform 107 which extends substantially the length of the car and depending from the under face of the plate member 107 are depending spaced bosses 108, 110 which aline with the lugs 93, 94 respectively, in the transverse ribs 86, 87. The bosses 108, 110 have sockets 111, 113, respectively, which are alined with the openings through the depending lugs 93, 94, respectively. Threaded in the openings 93, 94 are bolts or cap screws 114, 116 respectively, the ends of which project into the sockets 111, 113 respectively, to serve as hinge pins for the plate member 107. The bolts 114, 116 may be provided with lock nuts 117, 119, respectively. The frame 82 is recessed longitudinally along its inner edge for that portion of its width, designated at 120, which is laterally inward of the hinge pins 114, 116, so that the plate member 107 may rotate on the pins 114, 116 relative to the frame 82 and in a substantially vertical plane. Fixed to the plate 107 and depending therefrom through apertures 122 in the frame 82, are pins 123, preferably two in number, each having a stop member 124 on its free end, and between the stop member 124 and the frame 82 is a resilient means 125, preferably a coil spring, held under compression. The spring 125 serves to hold the plate 107 in contact with the outer supporting face 126 of frame 82, but permits the plate 107 to be rotated in a clockwise direction on the hinge pin 114 and 116, due to the longitudinal recess 120. This pivotal support for the plate member or platform 107 comprises a compensating means for a purpose to be described. Mounted rigidly, as by bolts, or the like, on the plate member 107 adjacent each end thereof, is a transverse supporting bar, designated 127, 128 respectively. Adjustably and horizontally threaded into the bar 127 and projecting forward from the end of the plate member 107, is an abutment pin 129, for a purpose to be described, which is preferably provided with a lock nut 130 to secure the pin in adjusted position. A plate member or platform 131, which is similar in all respects to the member 107, is supported on the frame 83, and therefore the primes of the reference characters which designate the parts of the member 107 are employed to designate similar parts of member 131. Substantially in the longitudinal center line of the plate 107 and fixed to and extending upwardly from the bars 127, 128, are vertical positioning pins 132, 133 respectively, for a purpose to be described. Supported on or carried by the laterally adjacent plate members 107, 131 respectively, are mold sections 134, 135, having complementary depressions or material receiving recesses 136, 137 respectively. Extending forwardly and rearwardly from the sections 134, 135 in a substantially horizontal plane, are lugs 138, 139 and 140, 141 respectively. Through the lugs in substantially the longitudinal center line of the sections 134, 135 are vertical apertures 142, 143 and 144, 145 respectively. The section 134 is removably held in position on the plate member 107 by the pins 132, 133 respectively, projecting into the lug apertures 142, 143. The section 135 is fixed on and secured to the plate member 131 by screws or bolts 146, 147 passed through apertures 144, 145, and threaded into the transverse bars 127', 128' respectively. The sections 134, 135 are supported on the plate members 107, 131 at substantially equal distances from the longitudinal center line of the car or truck 46. Suitable filler members 148, 149 may be secured on the plate members 107, 131 respectively along their longitudinal outer edges, to prevent the collection thereon of material with which the recesses 136, 137 are adapted to be filled. Carried by the sprocket chain 45 and extending vertically upward therefrom, are spaced pins 150, 151 which enter the sockets or recesses 71, 72 respectively, in the lugs 69, 70, to thereby positively but removably connect the truck or car 46 to the sprocket drive chain 45 for propulsion of the car along the trackway (see Fig. 5).

Extending longitudinally of and spaced laterally equal distances from the center line of each of the straightaway portions of the trackway 4, are guide members 152, 153, between which the lugs 69, 70, depending from the car or truck 46, travel. These guide members 152, 153 are preferably supported by the rails of the trackway. Secured to the rails at opposite points, as by rivets, bolts, or the like, 154, are angle members 155 which extend inwardly toward each other, and have corresponding flanges positioned vertically, as at 156, and in spaced, substantially parallel, relation. Fixed to the guide members 152, 153 are threaded pins 157 which extend through alined apertures in the flanges 156, and on either side of a flange 156 the pin is provided with a lock nut, as at 158, 159. The angle members 155 are spaced in pairs longitudinally of the trackway, the spacing preferably being at about one foot intervals. It will be apparent that the supports for the members 152, 153 provide a means for adjusting the members laterally of the trackway. The inside guide members 152 preferably have at their admission ends an inclined part 160 to provide the guideway with a flared inlet to insure proper entrance of the lugs 69, 70 between the members 152, 153.

Beneath and between the rail portions 8 and 11, is a substantially horizontal spill belt 161, which is endless and is passed over end pulleys 162, 163 journaled on shafts 164, 165 respectively, supported by the foundation 1. The belt 161 is preferably supported intermediate its ends by rollers 166 journaled on shafts 167 supported by the foundation 1. The pulley 162 is positioned at a receiving pit 168 with the periphery of the pulley extending inwardly beyond the edge of the pit. Within the pit 168 and at the bottom thereof, is a pulley or sprocket 169 journaled on a shaft 170 supported by the foundation 1. Directly above sprocket 169 is a second pulley or sprocket 171, and carried by the pulleys or sprockets 169, 171 is a belt or chain conveyor 172 having scoops 173 secured thereto. The pulley or sprocket 171 is preferably positioned at a considerable height above the trackway 4, and is journaled on a shaft 174 supported by any suitable superstructure or framework, not shown. Also supported by such superstructure is a hopper 175 having a chute 176 which is adjacent the upper end of the conveyor 172 to receive material delivered by the conveyor. The bottom wall of the hopper is preferably formed by a feed belt 177 which is preferably substantially horizontal and carried by pulleys 178, 179 journaled on shafts 180, 181 respectively, journaled in the superstructure or framework, not shown. The pulley 179 is positioned over spaced parallel, substantially vertical feed ducts or chutes 182, 183, which are preferably rectangular in cross-section, and of widths substantially equal to the widths of the mold sections 134, 135. The lower, open ends 184 of the feed ducts terminate above the trackway 4 and over the portion thereof formed by rails 8 and 11 at a height sufficient to permit free passage of a car and mold 46 thereunder. These ducts 182, 183 are fed with mold-forming material by the belt 177, and are spaced laterally such that they will feed material to the entire widths of the sections 134, 135 respectively. Mounted rigidly on the hopper 175 is a continuously operated electric motor 185, which is supplied with current from any suitable source. Fixed on a shaft $185^a$ journaled in the frame work is a pulley $185^b$ driven from the motor 185 by suitable reduction gearing. Fixed on a shaft $185^c$ adjacent the opposite end of the hopper, is a pulley $185^d$, which is driven from pulley $185^b$ by a belt or the like $185^e$. Fixed on shaft $185^c$ are sprocket wheels $185^f$. Fixed on shaft 174 is a sprocket wheel 186 which is driven by a chain $186^a$ from one of the wheels $185^f$. Adjacent the foundation 1 is journaled a shaft on which are fixed sprocket wheels $186^b$, and on the shaft 164 is a sprocket wheel $186^c$. The wheel $186^c$ is driven from the other of the sprocket wheels $185^f$ by means of a chain $186^d$, connecting wheels $185^f$ and $186^b$ and a chain $186^e$ from sprocket wheel $186^b$ to $186^c$. There is thus provided a positive drive for the scoop conveyor 172, and also for the spill belt 161.

The material feed belt 177 is driven intermittently by automatic means controlling a driving motor 187, which is supported rigidly on beams of the framework. Clamped to the rail 8 (see Figs. 15 and 16) by plates and bolts $187^a$, or the like, are casings $187^b$, $187^c$, comprising electric contact make-and-break means having spaced contacts $187^d$, $187^e$, respectively, which may be switches which are known commercially as door safety switches, type B made by the Cutler-Hammer Mfg. Co. of Milwaukee, Wisconsin. The casings are spaced apart longitudinally of the trackway, a distance substantially equal to the length of a car or truck 46, and equidistant from and on opposite sides of the vertical center line of the ducts 182, 183, as is evident in Fig. 1. The contacts $187^d$, $187^e$ are each closed by one arm of bell-crank levers 187$^f$, 187$^g$ which are pivotally supported in the casings 187$^b$, 187$^c$. The other arms of the bell crank levers 187$^f$, 187$^g$ project from the casings and extend above the level of the rail 8 and are bifurcated to form yokes to receive rollers 188 which are journaled in said yokes. The contact arm of lever 187$^f$ is normally held out of engagement with contacts 187$^d$ by a spring or the like, while the contact arm of lever 187$^g$ is normally held in engagement with the contacts 187$^e$ by a spring or the like. There is also provided a manual control 188$^a$ comprising a casing having two pairs of spaced contacts 188$^b$, 188$^c$, which are closed by suitable push button contact members 188$^d$, 188$^e$, the contacts 188$^d$ being normally open and the contacts 188$^c$ being normally closed. One of the contacts of each of the pairs 188$^b$, 188$^c$ are connected by an electric lead 188$^f$. The switches 187$^d$, 187$^e$ and 188$^b$, 188$^c$ are connected by leads to operate an automatic line switch 189, which is preferably magnetic, and may be such as the A. C. automatic starter, class 8527 made by the Industrial Controller Company of Milwaukee, Wisconsin, and which controls the intermittently operated motor 187 which is preferably three-phase, and supplied with current from the three-wire line designated L$^1$, L$^2$, L$^3$. The free contact of the pair of contacts 188$^b$, above described, is connected by a lead wire 189$^a$ to one of the contacts 187$^d$, and the free contact of the pair of contacts 188$^c$ is connected by a lead wire 189$^b$ to one of the contacts 187$^e$. From the line wire L$^3$, a lead wire $c'$ connects to the wire 189$^a$. From the free contact of the pair of contacts 187$^d$, a lead wire 189$^c$ runs to the contact connecting wire 188$^f$ in the control casing 188$^a$. From the free contact of the pair of contacts 187$^e$, runs a lead wire 189$^d$ in which may be inserted a manual control means 189$^e$, preferably a single throw switch of either the snap or knife switch type. Connected to the lead wire 189$^d$ is a lead wire $c^3$, which is connected to the line wire L$^1$, and which passes through the casing containing the switch 189, and in series in the lead wire $c^3$ within the casing (not shown) are dash pot controlled relay switches 190, 190$^a$. Also in the casing and in the lead wire $c^3$, is a magnet 190$^b$ adjacent to which are three pivoted switch blades 190$^c$ connected together by any suitable insulating means for simultaneous parallel movement. The blades 190$^c$ are normally held out of contact with the line wires L$^1$, L$^2$, L$^3$ by suitable spring means or the like, and are pulled into contact with the line wires L$^1$, L$^2$, L$^3$ respectively, upon energization of the magnet 190$^b$. The motor 187 is connected by leads T$^1$, T$^2$, T$^3$ to the blades 190$^c$ respectively. In the leads T$^1$ and T$^2$ are solenoid windings 190$^d$, 190$^e$ which trip or open the switches 190, 190$^a$ respectively, when the current exceeds the full load rating of the motor. From the lead wire 189$^c$ a lead wire $c^2$ runs into the casing of the switch 189 adjacent one of the blades 190$^c$, and is provided with a contact 191 for engagement by one of the blades 190$^c$ when the blades 190$^c$ are in contact with the line wires L$^1$, L$^2$, L$^3$.

Supported above the straightaway portion of the trackway formed by rails 8 and 11, are rammer means, strike means, and vent means for each of the sections 134, 135. Since the means adapted to cooperate with section 135 are similar to those for section 134, the primes of the reference characters designating the parts or elements of the means cooperating with section 134, will be applied to the means which act upon section 135. Secured adjacent the lower end 184 of chute 182 and to the front wall 192 thereof, is a substantially horizontal sleeve 193 through which extends a shaft 194. Journaled on the projecting ends 195, 196 of shaft 194, are bell-crank levers 197, 198, each having a downward projecting arm 199 and having forwardly projecting arms 201, 202 respectively. Each of the arms 199 has threaded therethrough an adjustment screw 203 which acts against the wall 192 to control the height of the free end of arms 201, 202 above the trackway 4. At the free ends of arms 201, 202 are semi-circular sockets 204, 205 respectively, in which are supported and fixed against rotation by set screws, or the like, 206, the ends of a shaft 208. Fixed on the shaft 208 between the arms 201, 202 is a weight means 209, to the underside of which is fixed, as at 210, a downward inclined plate 211 extending forwardly or to the right of Fig. 1 from the wall 192, and of a width substantially equal to the width of section 134. Secured to the upper face of plate 211 is a heater means 212 preferably electrical, from which extend electrical conductors 213, and which is of any suitable type which will keep plate 211 dry to prevent adherence of wet material thereto. At each side of the trackway 4 are two supporting posts, designated 214, 215 and 216, 217, which are secured in or to the foundation or base 1. The posts 214, 216 and 215, 217 are connected rigidly by cross-bars 218, 219 respectively. Substantially in the vertical plane of the center line of section 134 are angle brackets 220, 221 secured to the cross-bars 218, 219 respectively at substantially the same height above the trackway. Journaled in apertures 222, 223 in these lugs or brackets 220, 221 respectively, are the opposite ends of a shaft 224 on which is supported a substantially rectangular frame 225 having end members 226, 227 through which shaft 224 passes and which are rigidly connected by side members 228, 229 (see Fig. 13). Projecting horizontally from the side member 228 adjacent the ends thereof are pins 230, 231, on which are swingingly supported depending links 232, 233 respectively. The side member 229 also has horizontally projecting pins 234, 235 adjacent its ends on which are swingingly supported depending links 236, 237 respectively. The free ends of the links 232, 233 are connected by a side bar 238 which is pivoted to the links by pins 239, 240, respectively. The free ends of the links 236, 237 are connected by a side bar 241 which is pivoted to its links by pins 242, 243 respectively. Carried by the side bars 238, 241 are strike members 244, 245, preferably in the form of rectangular plates, which are rigidly secured at their side edges in any suitable manner, to the side bars 238, 241 respectively, as at 250, 251 and 252, 253.

The plates 244, 245 are inclined upwardly in the direction of travel of the car 46 and away from the feed ducts 182, 183, and are also inclined inwardly against the direction of travel of the car or truck 46 or toward the feed ducts 182, 183 and the center line of the trackway, as is clear from Figs. 2, 13 and 16. It will be apparent that the plates 244, 245 in their striking action will remove excess mold material from the top of section 134 with a shearing cut and pass excess material toward and from the outside edge of the car 46. Secured to the top edge of plate 245 is one end of a contractile spring 254, the other end of which is fixed to the end member 226, and surrounding the spring 254 is a tube or sleeve member 255 which serves as a stop means, and which is of such length that its ends will abut the plate 245 and member 226 when the links 232, 233, 236 and 237 are substantially vertical, so that the bottom edges of the plates 244, 245 are normally held in their lowermost positions. Projecting below the bottom edge of plate 244 at the side edges thereof, are adjustable guide members 256, preferably angle-irons, which are adjustable vertically on the plate 244 by nuts and bolts 257 passed through upright slots 258 in the plate 244. The substantially horizontal flanges 259 of the angle members 256 ride upon the top edges of the inside and outside walls 259ᵃ, 259ᵇ, of the section 134 and are preferably adjusted so that the bottom edge of plate 244 will be substantially .031 inches above the plane of the top of section 134, and will leave a layer of mold material .031 inches thick above the plane of the top face of the section 134. Fixed on the rear face of plate 245 and adjacent the lower edge thereof is a heater means 260, preferably electrical, from which run suitable current leads. The heater means 260 is provided to maintain the plate 245 dry to prevent adherence of wet or moist mold material thereto. Secured rigidly to the plate 245 by angle brackets, or the like, 261, is a substantially horizontal plate member 262 which underlies the bottom edge of plate 245.

The underface of the plate member 262 is preferably substantially .016 inches below a horizontal plane through the bottom edge of plate 244, so that the strike means 245 will shave off a layer of mold material substantially .016 inches thick, and leave a thickness above the section of substantially .015 inches. Threaded through this plate member 262 adjacent its rear edge, and in the vertical planes of the side walls of section 134, are adjustment screws or bolts 263 having lock nuts, which are preferably adjusted so that the bottom face of plate member 262 will clear the plane of the top face of section 134 by substantially .015 inches, as and when the section 134 moves beneath the strike means and the angle irons 259 leave the top side edges of the section 134. Fixed to the outside face of end member 226 at each side thereof, are angle brackets 264, 265, each having a horizontal arm projecting over the angle beam 218. Through apertures in the horizontal arm of bracket 264 and the beam 218 passes freely a bolt 266 having a nut thereon above bracket 264. On the bolt 266 between the nut and bracket 264 and also between the bracket 264 and beam 218 are coil springs 267 which normally and resiliently hold the frame 225 substantially horizontal. Through the horizontal arm of the bracket 265 is threaded a bolt 268 provided with a lock nut. The bolt 268 serves as a stop means to limit downward tip of the outside edge of frame 225, and is set preferably to allow a tip or tilt from the horizontal of substantially three-eighths of an inch before the bolt contacts the beam 218.

Secured to the cross-bar 219 on its opposite side or face from the bracket 221 by rivets, or the like, is a plate member 269 having a substantially horizontal journal bearing or sleeve 270 through which extends a shaft 271. Journaled on the ends of the shaft 271 are bell-cranks 272, 273 having horizontal arms 274, 275 respectively, and each having a depending arm 276. Threaded through the free ends of each of the arms 276, substantially at right angles to the shaft 271, is an adjusting screw 278, which screws are adapted to abut a cross-bar 280 extending between and fixed at its ends to the posts 215, 217 below the cross-bar 219. The free ends of the arms 274, 275 are provided with substantially U-shaped bearings 281, 282 respectively. Positioned between the arms 274, 275 is a drum or wheel 283, through which extends a shaft 284 having its opposite ends journaled and supported in the bearings 281, 282 respectively. On the circumference of the drum 283 and extending partially therearound a distance substantially equal to the length of the section 134, is a plate member 287, which is rigidly secured to the drum in any suitable manner. The plate member 287 has ribs 288 extending circumferentially of the drum 283 and transverse ribs 289, the longitudinal and transverse ribs together being adapted to form intersecting grooves in the material contained in section 134, which grooves serve as vent means. The drum 283 is provided with brake means, preferably in the form of a band brake comprising a strap or band 291 secured at one end, as at 292, to the shaft 271, and extending beneath and around the drum with a tension exerting weight 293 secured, in any suitable manner, to its free end. Secured to the circumference of the drum 283, forwardly of the plate member 287, by means of screws or rivets 294, or the like, is a lug or arm 295 extending substantially radially therefrom into the path of travel of the abutment pin 129 mounted on the forward end of the car or truck 46. Secured to the plate member 269 are angle brackets 296$^a$ each having an arm projecting horizontally therefrom in a substantially vertical plane. Extending between and fixed in apertures in the posts or columns 215, 217 and passing through apertures in the brackets 296$^a$ is a horizontal shaft 296$^b$. Journaled on the shaft 296$^b$ at points overlying the longitudinal side walls of the sections 134, 135 are sleeves 296, each having a lever arm 296$^c$ fixed thereon in the vertical plane of the arms 274, 275. At the outer free end of each of the arms 296$^c$ which terminate adjacent the bearings 281, 282, are loops or oblong frame members 296$^d$, through which one of the arms 296$^c$ and its corresponding arms, designated 274, 275, 274' and 275', extend. Through the base of the member 296$^d$ is threaded an adjustment screw 296$^e$, preferably provided with a lock nut, and which bears against the underside of arm 274 when the arm 296$^c$ is lifted or raised. Substantially in vertical planes through the top edges of the longitudinal walls of sections 134, 135, are lever arms 296$^f$, which are secured rigidly to and extend from the sleeve 296 respectively, and which extend downward therefrom at an acute angle of about 15° to the vertical. It will be noted that each of the pairs of arms 296$^c$, 296$^f$ form a bellcrank lever. The free end of each of the arms 296$^f$ has journaled thereon a roller 296$^g$ which rides upon one of the top edges of longitudinal walls of the sections 134, 135 when the car or truck 46 passes beneath the drums 283, 283'. Each of the screws 296$^e$ is set so that as its roller 296$^g$ rides upon the top edge of a wall, the arm 296$^f$ will rotate its sleeve 296 counterclockwise of Fig. 10, lifting its arm 296$^c$ and ringing screw 296$^e$ into contact with the respective arms 274, 275, 274', 275', so that the face of groove forming plates 287, 287' will be substantially at the exact height of the plane of the top edges of sections 134, 135 respectively, and parallel to the planes of the faces of its sections as the drums are rotated by engagement of the pins 129, 129' and lugs 295, 295', so that the grooves in the mold material formed by ribs 288, 289 and 288', 289' will be accurately positioned.

The drums 283 and 283' and the sections 134 and 135 differ, however, from each other, in the following respects: The drum 283 has secured thereto and projecting therefrom a pair of laterally positioned posts 296 spaced apart substantially one-third of the width of section 134 and equidistant from the longitudinal center line thereof and adjacent the rear end of plate member 287, and of a height substantially equal to the depth of recess 136 in section 134. In the recess 137 of section 135 are fixed a pair of vertical posts 297, which terminate in the plane of the top edge of section 135 and which are positioned at corresponding points in section 135 to the points at which the posts 296 form recesses in the mold material of section 134 as the truck passes beneath drums 283, 283'. Fixed in the recess 137 is a vertical pin 298 positioned in the longitudinal center line and adjacent the rear end thereof. Through the circumferential wall of the drum 183' and the plate member 287' is an aperture 299 adjacent the rear end of member 287', and in a vertical plane through the longitudinal center line of recess 137, and at a point such that it will overlie the post 298 as the drum 283' rolls over the top face of section 135. Secured in this aperture in any suitable manner, as by threaded engagement, is a cylindrical casing 300, substantially flush with the cylindrical face of the drum and projecting thereinto (see Fig. 11). Within the casing 300 is a piston or plunger 301 having a stem 302 which projects through a cover member 303 fixed on the casing. Around the stem 302 is a coil spring 304 which abuts the member 303 and the plunger to urge the plunger outward to the limit of movement permitted by adjustment nut 305 threaded on stem 302 and engaging the outer face of cover member 303.

In Fig. 10, which is a detail showing slight modifications, the brake means is shown as acting on a separate brake drum 306, which is of less diameter than the drums 283, 283'. In this modification I have also shown the drum 283 as having two plate members 287 of different arcuate lengths adapted to cooperate with mold sections of two different lengths, but of combined lengths equal to the lengths of members 287, and which sections are carried alternately along the trackway.

Positioned laterally of the rail portions 8, 11 and outside of the trackway, are columns 307 on which are supported angle bars 308, 309 carried by angle brackets 310 fixed to the columns and bars, the angle bars 308, 309 extending longitudinally of and substantially parallel with the trackway, and having flanges 311, 311$^a$ and 312, 312$^a$ respectively. The flanges 311, 312 are secured by rivets, bolts, or the like, to the angle bracket 310, and are substantially horizontal and project inwardly toward the trackway, and the flanges 311ª, 312ª are substantially vertical and extend upwardly from the flanges 311, 312 respectively. Secured to the vertical flanges 311ª are longitudinally spaced arcuate plate members 313, 314 of substantially equal curvature, which extend upwardly and inwardly over the trackway, and secured to the vertical flange 312ª are longitudinally spaced arcuate plate members 315, 316 of substantially equal curvature and of equal curvature to members 313, 314, and which extend upwardly over the trackway toward the members 313, 314 respectively. The opposed plate members 313, 315 together form a cam plate having a groove or slot therebetween, as do the opposed plate members 314, 316, each of the cam plates being substantially semi-cylindrical and overlying the trackway 4 for passage of the cars 46 through or beneath them. The member 313 is preferably hinged to the flange 311ª by horizontal hinge members 317 to swing in a vertical plane. The arcuate member 314 is preferably supported by spaced vertical straps 318 fixed rigidly at their opposite ends to the member 314 and the flange 311ª. The members 315 and 316 are preferably fixed directly and rigidly to the vertical flange 312ª by rivets, bolts, or the like 319. The free edges of the plate members 313, 315 which serve as cam guide faces, and together form a cam groove or slot, are inclined upwardly at equal inclinations with a slight curvature, as at 320, 321 from points 322, 323 of the plate members respectively, which are in a horizontal plane tangent to the bottom trace of the cam rollers 106, 106', indicated by the line Y—Y of Fig. 1. The equal upward inclination terminates above the trackway at points 324, 325, which are spaced apart substantially equidistant from a vertical plane through the longitudinal center line of the trackway, and a distance substantially equal to twice the distance X, Fig. 1, which is the height of the top edge of the mold sections 134, 135 above the bottom trace of their respective cam rollers 106, 106', indicated by the line Y—Y of Fig. 1. From the point 324 the edge or cam face of the member 313 is inclined downwardly, as at 326, toward the trackway, and terminates at a point 327 substantially in the plane of flange 311ª and in the horizontal plane of points 322, 323. The plate member 315 crosses the longitudinal center line of the trackway, Fig. 2ª, and extends along the trackway for substantially half the length of the inclined edge 326, with the edge or cam face 326ª of the member 315 terminating at 328, and being spaced from the edge or face 326 of member 313 along its length, equidistant with the distance between points 324, 325 to form a continuation of the cam groove or slot. The members 313, 315 are preferably held in this spaced relation by safety means comprising angle brackets 329, 330 rigidly fixed to the members 313, 315 respectively, and between which is a hollow spacer sleeve 331. Through the vertical parallel flanges of the angle brackets 329, 330 and the sleeve 331, is passed a bolt or rod 332 having on one end a head 333 which abuts the bracket 330, and on its free other end which projects beyond the bracket 329, a coil spring 334 positioned between the bracket 329, and an adjusting nut 335 threaded on the rod 332 and by which the tension of the spring 334 may be adjusted. The spring 334 permits the plate member 313 to move away from the plate member 315 on its hinges 317 to thereby widen the cam slot to prevent injury to the apparatus. The members 314, 316 are spaced longitudinally of the trackway from the members 313, 315, as is evident from Figs. 1ª and 2ª. The edge 336 of the plate member 314 which serves as a cam face starts at the end of the plate member 314 adjacent plate member 313 and at a height above a horizontal plane through points 322, 323 equal to twice the distance X less the diameter of the cam roller 106 and inclines upwardly therefrom over and along the trackway to the center line thereof, and thence continues across the center line of the trackway for a short distance with the cam face having a downward inclination, as at 337, beyond the center line of the trackway, due to the downward curvature of member 314. The plate member 316 extends upwardly over and beyond the center line of the trackway with the cam face or edge 338 thereof starting at a point 339 opposite the edge 336 and spaced therefrom substantially the diameter of the cam roller 106', and inclining upwardly and along the trackway to the center line thereof in spaced relation to the edge 336, whence it continues along the trackway at a downward inclination to form a cam groove or slot 340 with edge 336 of substantially constant width to the termination of plate member 314. The inclined edge or cam face 338 continues downward and terminates at its bottom end at a point 341 substantially in the horizontal plane of points 322, 323, and also in the plane of flange 312ª. Suitable braces or tie rods 342, 342ª may be employed to rigidly hold the members 314, 315 and 316 in their predetermined spaced relation.

Fixed to the inside of the plate member 313, substantially in the vertical plane of points 324, 325 of plate members 313, 315, respectively, by rivets, bolts, or the like, is a bracket 343 having a substantially horizontal arm 343ª which extends transversely to and over the trackway at a height sufficient to permit passage of the truck 46 thereunder. Fixed to and depending from the arm 343 is a brush means 343ᵇ adapted to engage the top surface of the truck 46 to sweep the same free of any mold material which may overflow from the mold section 134. On the opposite side of the trackway from brush means 343ᵇ, is a brush means 344 rigidly mounted on a horizontal arm 344ª of a bracket 345 which extends over the trackway and which is secured by rivets, bolts, or the like, to the inside of the plate member 314 at its end adjacent the plate member 316. The brush means 344 is substantially the same height above the trackway as the brush means 343ᵇ, such that it may engage the opposite side of the top surface of the truck 46 which lies beneath section 135 to sweep therefrom any mold material which may collect thereon.

Extending longitudinally of the cam plate members are angle bars 346, 347 secured to the vertical flanges 311ª, 312ª respectively, and having horizontal inwardly extending flanges 346ª, 347ª respectively, and beneath which the truck axle sleeves 67 and 65, 66 respectively, pass (see Figs. 3 and 4). The flange 346ª cooperates with the axle sleeve 67, and flange 347ª cooperates with sleeves 65 and 66 to prevent the wheels of the car or truck 46 from being lifted off the rails of the trackway as the car passes through or beneath the cam means.

Between the arcuate plate members 314, 316 is a yoke 348 comprising two angle brackets having superposed vertical arms 349, 350 which are fixed by rivets, bolts, or the like, to the vertical flange 312ª of the angle bar 310 and having vertically spaced horizontal arms 351, 352 which overlie the trackway at a sufficient height to permit passage of the truck 46 thereunder. Pivoted between the arms 351, 352 of the yoke on vertical pins 353, 354 journaled in bearing openings in the arms for oscillation in a horizontal plane, is a vibrating means 355 preferably comprising a compressed air hammer of any well known type and make having a reciprocable plunger 356 which is positioned for reciprocation in a horizontal plane, and which extends beyond or across the center line of the trackway. The axis of the plunger 356 is at a height above the section 134 substantialy equal to half the height of the section 135. Fixed on the air hammer 355 between its rear end and the pins 353, 354, is a stop member 357 adapted to engage the horizontal arm 351 to limit clockwise rotation of the hammer relative to Fig. 2ª on its bearing pins 353, 354 beyond a line substantially at right angles to the longitudinal center line of the trackway. The air hammer is normally maintained with the stop member 357 in engagement with arm 351 by a light tension spring 358 fixed at one end to the hammer between the center line of the trackway and the pivot pins 353, 354 and at the other end to the plate member 314 or other rigid support such that the hammer 355 may rotate horizontally on its pivot pins counterclockwise of Fig. 2ª. The hammer is supplied with air under pressure from any suitable source (not shown) by a conduit 359 connected thereto and which is flexible for a portion of its length to permit swinging movement of said hammer. Air flow through the conduit 359 is controlled by a valve means 360 of any suitable type having a vertically reciprocable valve stem 361 which is downwardly or inwardly movable to open the valve, and which is automatically returnable to and normally held in its upward or outward valve closing position by suitable spring means. The valve means 360 is rigidly positioned adjacent the outside face of the rail 8 and opposite the hammer 355 with the valve stem 361 projecting above the level of the wheel engaging face of the rail, and into the path of travel of the truck wheel 64 so that the wheel 64 will engage the end of the stem and depress the same, opening the valve means 360. Suitable supporting means such as brackets and straps 362 fixed by bolts or the like to the rail 8 may be employed to hold the valve means 360 in position.

At the sides of the straightaway rail portions 9, 12 adjacent the semi-circular end rail portion 7, are vertical, oppositely disposed support beams or columns 363, 364 respectively, which are rigidly connected near their bottom beneath the trackway by a cross-beam 365 fixed thereto by rivets, bolts, or the like, 366. Carried by these columns 363, 364 is a mold section cleaning means 367, comprising a substantially horizontal spray head or pipe 368 fixed at its ends to the columns 363, 364 respectively, by U-shaped straps 369, 370. The inside end of the pipe 368 is closed and sealed, as by a plug 371, or the like, while the opposite end which extends outwardly beyond the side rail 9 is connected by a three-way fitting 372 to an air pressure supply conduit 373 receiving air under pressure from any suitable source (not shown), such as a compressor. The under face of the spray pipe 368 toward the trackway end 7, is provided with a plurality of equally spaced spray apertures 374 which extend longitudinally of the pipe. The third branch of the fitting 372 opens vertically upward and is internally threaded to receive a coupling 375 for an oil supply tank or reservoir 376 of any suitable gravity feed type in which the feed is controlled by a valve, preferably manually regulatable, as by a valve stem and hand wheel 377. In the conduit 373 is a valve means 378 which is preferably of the same type as the valve means 360, operable by a reciprocable valve stem 379. The valve means 378 may be rigidly supported adjacent the trackway by an angle bracket 380 riveted or bolted to the column 364, and to which the valve means is secured by straps 381, or the like. Secured by bolts, or the like, 382, to the under face of the outer side rail 9, are angle brackets 383, 384 spaced apart substantially the length of the car 46 and equidistant from and on opposite sides of the valve means 378 and longitudinally of the trackway. The brackets 383, 384 have substantially vertical depending arms 385, 386 respectively, which are substantially in a vertical plane through the stem 379 and parallel to the trackway. Pivoted on the arms 385, 386 by pivot pins 387, 388, are links 389, 390 respectively, which extend upward above the level of the top end of stem 379 and which are connected by a substantially horizontal bar 391 pivoted at its ends to the links by pins 392, 393 respectively. The bar 391 overlies the end of the stem such that downward movement of the bar will act through the stem to open the valve means 378. The top edge 394 of the bar 391 extends above the level of the rail 9 and adjacent the side of the trackway in the path of travel of the truck wheel 64 for downward movement thereby. The forward or approach end 395 of the bar is inclined upwardly from the level of the trackway to smoothly receive the wheel 64. The links are slightly inclined from the vertical toward the end 6 of the trackway, so that the weight of the truck will rotate the links 389, 390 clockwise of Fig. 12 to depress stem 379. The links and bar are normally held in their uppermost position (Fig. 12) by a tension spring 396 connected at its opposite ends to the bar 391 and to the trackway or other rigid support, and by a stop pin 397 projecting from the rail 9 into the path of travel of the link 389.

The electric motor 22 is preferably controlled by a push button switch 398 in the motor circuit, and which is secured to the cam plate member 315.

The operation of the apparatus is as follows: The apparatus is particularly adapted for use in making or forming cores of sand, or the like, to be employed in the casting of hollow metal bodies, and specifically for use in casting metal radiator sections. However, I wish it to be understood that my apparatus may be employed for other uses wherein it is desired to form a molded article of plastic or finely divided material having a suitable bonding agent, and I do not limit myself to the formation of cores generally, or to the formation of cores for radiator sections, as it is apparent that the apparatus is capable of use in forming molded articles other than cores. A number of cars or trucks 46 are placed upon the trackway 4 at spaced intervals of, say, three or four feet, and each of the cars is connected by pins 150, 151 to the drive chain 45 for continuous but slow propulsion by the motor 22 along the trackway in the direction of the arrow 399, Fig. 2. Each of the cars has a platform or member 107 which removably carries a mold section 134 positioned thereon by pins 132, 133, and which will hereafter be termed the "drier." Each of the cars 46 also carries a mold section 135 fixed rigidly to its platform or plate member 131 by screws or bolts 146, 147, which section will hereafter be termed the "box." The motor 185 is started, which drives the spill belt 161 and the conveyor 172, and the motor 22 is started by the push button 398 to drive the chain 45 which propels the cars or trucks 46 along the trackway. At a station A adjacent the end 7 of the trackway and along the straightaway portion formed by rails 8 and 11, is stationed an operator who places a drier 134 upon the platform 107 as the car 46 passes before him, positioning the same thereon by means of the pins 132, 133 on the platform and the apertures 142, 143 in the drier. The car will move along the trackway to the cleaning means, and when the front ends of the box and drier are substantially beneath the spray pipe 368, the wheel 64 of the car will engage the bar 391 at its inclined end 395, thereby depressing the bar and the valve stem 379 to open the compressed air line or conduit 373, which will pick up oil from the reservoir 376 and forcibly spray it through the ports 374 upon the box and drier to effectively clean the mold recesses 136, 137 of the drier 134 and box 135 respectively. The valve means 378 will be held open until the wheel 64 leaves the bar 391, when the valve will close automatically, this closing of the valve occurring as the rear end of the truck passes beneath the spray pipe 368. The car or truck 46 carrying the drier and box continues along the rails 9, 12 to the station B. At this point is stationed an operator who places "tins" in the box and drier which serve to support the baked core on the chaplets in the radiator section mold. The car or truck 46 then passes around the end of the trackway formed by rail portions 6 and 13 to the straightaway portion formed by rails 8 and 11. As the front end of the truck reaches the feed ducts 182, 183, the outside rail engaging wheel 64 will roll onto the roller 188 and depress the same, causing the lever 187$^f$ to close the magnet circuit at contacts 187$^d$, and current will flow from the line wire L$^3$ through leads $c'$, 189$^a$ across contacts 187$^d$, through leads 189$^c$, 188$^f$, closed manual stop switch 188$^e$, lead 189$^b$, closed automatic stop switch 187$^e$, lead 189$^d$, lead $c^3$ to magnet 190$^b$ and line wire L$'$. Closing of the circuit will energize magnet 190$^b$ to pull the blades 190$^c$ of the line switch into contact with the line terminals to close the line circuit from L$'$, L$^2$, L$^3$ to T$'$, T$^2$, T$^3$, respectively, to the motor 187. The motor 187 drives the feed belt 177 to feed sand or mold material from the hopper 175 to the feed ducts 182, 183 through which the sand drops into the recesses 136, 137 of the mold sections 134, 135, respectively. The speed of the belt 177 is determined to provide a feed of mold material which will amply fill the recesses 136, 137 with a substantially equal distribution of material. It will be apparent that the impact of the falling sand upon the mold sections will serve to pack the sand in the mold recesses and is in effect a mold ramming means. As the wheel 64 leaves roller 188 of contact box 187$^b$, the roller and the lever 187$^f$ which are spring returned, will break contact at 187$^d$, but contact will have been made between one of the blades 190$^c$ and contact point 191, and the line circuit will be maintained. The current will now flow as follows: From L$^3$ through leads $c^2$, 188$^f$, closed manual stop switch 188$^e$, lead 189$^b$, closed automatic stop switch 187$^e$, leads 189$^d$ and $c^3$ to the magnet 190$^b$, and thence to line wire L', such that magnet 190$^b$ is maintained energized to hold the line switch closed. As the rear end of the truck 46 passes from beneath the ducts 182, 183, the rail engaging wheel 64 will roll onto roller 188 of stop switch 187$^e$ and depress contact lever 187$^g$ to break the magnet circuit at contacts 187$^e$, as is evident from the foregoing description and drawings, which will release the switch blades 190$^c$ and permit them to be moved by any suitable spring means to break contact with the line wires L', L$^2$, L$^3$ and thus cut out and stop the motor 187 and the feed belt 177. The manual "Start" and "Stop" switches 188$^d$, 188$^e$ are provided so that the magnet circuit may be made and broken manually and at will if it should be desired to stop the motor 187 in case of accident or to run the motor 187 for test or otherwise. The operation of the switches 188$^d$, 188$^e$, and the circuits completed thereby, will be apparent from the foregoing description of the automatic switches. A control switch 189$^e$ may be inserted in the return lead 189$^d$ to the magnet 190$^b$ to serve as a master switch. Any mold material which may overflow the sides of the sections 134, 135 will fall through the trackway to the spill belt conveyor 161 and be emptied into the pit 168 to be picked up by the scoops of the conveyor or elevator 172 and be returned to the sand hopper 175. As the sections 134, 135 filled with sand pass from beneath the ducts 182, 183, the sand or mold material in the sections is acted upon by the ramming or pressing means 211, 211', which are weighted down by the members 209, 209' and serve to ram or press the sand into the recesses 136, 137 respectively, and also to strike a predetermined surplus therefrom, the crush of the ramming means being determined by the setting of the set screws 203, 203', which limit the downward movement of plates 211, 211'. The heaters 212, 212' prevent the adherence of the sand to the plates which would change the height of the ramming means above the box and drier. The truck 46 is next propelled by chain 45 to and beneath the strike means, comprising the striking plates 244, 245 which act successively on the sand in section 134 and the plates 244', 245' which act successively on the sand in section 135. The plates 244 and 244' are set so that the flanges 259, 259' respectively, will ride on the top edges of the side walls of the sections 134, 135 of minimum height, so that as above described, a layer of sand substantially .031 inches thick will be left on the sections above the plane of their top faces. By reason of the fact that the plates 244, 245 and 244', 245' are universally mounted, the plane of the top face of the sand in sections 134, 135 after the striking action, will be parallel to the plane of the top faces of the respective sections 134, 135, even though the top faces of the sections 134, 135 are not horizontal. The universal movement will also permit of proper accurate striking of the material in a section which is of greater height than a section of minimum height for which the striking means is set. This is true because if the front end of sections 134 or 135 strikes the angle bracket guides 259 or 259', the side bars 238, 241, due to their two point support, will cause the plates 244, 245 or 244', 245' to lift vertically to the proper height to accommodate the section. The plates 244, 244' provide a roughing cut, removing the greater part of the excess sand, and then the plates 245, 245' with their horizontal plates 262, 262' finish cut the excess material down to leave a smooth, even and plane surface at a height of substantially .015 inches above the plane of the sections. As the angle bracket guides 259, 259' leave the side walls of the sections, the plates 245, 245' would drop down upon the sections and not maintain a sand thickness of .015 inches, so I have provided the screws or bolts 263, 263' which come into play at this point and ride on the side walls of the sections, to hold the plates 245, 245' their required distance of .015 inches above the top planes of the sections. The angle bracket guides 259, 259' also serve to clear the top faces of the side walls of the sections of sand. The heaters 260, 260' serve to prevent sand from clinging or adhering to the plates 245, 245' and aid in effecting an even, level surface to the sand in the drier and box recesses. The truck 46 next carries the drier and box beneath the vent means, comprising the drums 283, 283'. The set screws 278, 278' are adjusted so that the planes of the top faces of the drier and box of minimum height will be slightly above horizontal planes tangent to the faces of the plates 287, 287' respectively. The set screws 296$^e$ are also set so that as the rollers 296$^g$ ride on the top edges of the section walls, the drums will be raised so that horizontal planes tangent to the under faces of the plates 287, 287' will be slightly below the planes of the top faces of sections 134, 135 so that there will be frictional contact between the plates 287, 287' and the top side edges of the drier and box respectively, to cause rotation of the drums 283, 283' thereby. Then as the sections are advanced, the rollers 296ᵉ will ride up onto the side walls of the drier and box, thus elevating the drums 283, 283' through the lever arms 296ᶠ, 296ᵉ to the exact height for proper cooperation between the drums and sections. As the drums 283, 283' are raised, the pins 129, 129' which project forwardly from the car will engage the lugs 295, 295' respectively, and will start rotation of the drums 283, 283' in a counterclockwise direction of Fig. 2 at the proper instant to bring the ribs 288, 289 and 288', 289' into proper relation to the top face of the drier and box. As the sections engage the drums, they will cause rotation of the drums by frictional engagement. The post 296 on the drum 283 forms a hole in the sand in the recess 136 adjacent its rear end which hole is symmetrically positioned in the recess 136 with respect to the post 297 in the recess 137, as described above. As the drum 283' is rotated, the plunger 301 will take position over the pin 298 so that should there be any sand on the end of pin 298 the plunger may move upward or inward without raising the drum 283', and thereby varying the depth of the grooves in the sand in the sections. As the drums 283, 283' are rotated, and the faces of plates 287, 287' turned into contact with the top surface of the sand in sections 134, 135, the longitudinal ribs 288, 288' and transverse ribs 289, 289' of the vent plates 287, 287' will form respectively longitudinal and transverse vent grooves in the core sand of the drier and box. The longitudinal grooves formed in the sand in section 135 open into the hole through the sand in the box section of the core made by the vent pin 298. The band brakes 291, 291' serve to stop rotation of the drums whenever there is no driving force applied to them, and also to prevent the drums from rotating ahead of the pins 129, 129' or spinning upon starting impact, and also from rotating after the drier and box have passed from beneath the drums. From the vent means the drier and box pass to the booking means, comprising the cam plates 313, 315 and 314, 316. The sleeves 67 and 65, 66 on the wheel axles first pass under the horizontal flanges 346ᵃ and 347ᵃ respectively, which serve to hold the car down and the car wheels on the rails. As the cam rollers 106, 106' arrive at the transverse line through points 322, 323 respectively, which is the beginning of the cam guide faces 320, 321, the drier and box supporting frames 82, 82' will be rotated on shaft 81 in counterclockwise and clockwise direction when looking in the direction of travel of the car, or upwardly, respectively, toward each other. When the cam rollers 106, 106' have progressed along the cam faces 320, 321 of plates 313, 315 respectively, to the points 324, 325, then the drier and box will abut each other and will be in substantially vertical position and parallel relation, and will be booked. In this position the complementary recesses 136, 137 of the drier and box will be in registry, and the parts of the core will be matched and pressed together to form an integral unit with the vent grooves of each section registering with those of the other to form vent passages, and with the stay post openings formed by stay posts 296, 298 being alined. Should it happen that the combined height or depth of the sections 134, 135 is greater than normal, or that the top faces of the sections are not horizontal when the drier and box are laterally positioned or flat on the car, then the plate members or platforms 107, 131 will rotate on their pivotal supports on the frame members 82, 82' to compensate for the discrepancy and permit the sections to engage over the complete widths of their faces, as will be apparent. From the points 324, 325 the box and drier are moved together in tightly booked relation with the cam rollers 106, 106' respectively, engaging the cam faces 326, 326ᵃ which guide the drier and box, swinging them together with a clockwise rotation toward the original horizontal position of the drier on the truck. As the cam roller 106' leaves the cam face 326ᵃ at point 328, the box is supported upon the drier, and when the roller 106 reaches the point 327 of cam face 326, the drier and box will be in superposed horizontal position, as in Fig. 4. It will thus be seen that the drier 134 has been oscillated through an angle of substantially 90° during the time that the box 135 has been swung through an arc of substantially 180°, comprising a single stroke of its oscillation. If for any reason the distance between the cam plate engaging points on the faces of the cam rollers 106, 106' should be greater than the normal width of the cam slot formed by cam faces 326, 326ᵃ, the cam plate member 313 may swing outward to compensate for the greater width, compressing the spring 329 and thus preventing injury to the booking means. As the truck passes through the cam plate members 313, 315, and the drier and box supporting frames 82, 82' are being raised, the brush means 343ᵇ and 344 will sweep the supporting surface of the truck free of sand, as shown in Fig. 3. As the car passes out from beneath the cam plate members 313, 315, the bearing lug 92' of the car will strike the plunger 356 of the air hammer 355 and will swing the hammer counterclockwise of Fig. 2ᵃ out of the way of member 92'. When the member 92' passes beyond the plunger 356, the spring 358 will return the hammer to the position of Fig. 2ᵃ. At substantially the time that the cam roller 106 leaves the end 327 of the cam face 326, the air hammer having been returned to normal position of Figs. 1ª and 2ª, the truck wheel 64 will roll onto the valve stem 361 and depress the same, opening the valve means 360 in the compressed air line or conduit 359 to cause operation of the air hammer and rapid reciprocation of the plunger 356 to sharply strike the box section 135 between members 75 and 76 to vibrate the same and loosen the part of the molded core which is in the box section. As the truck continues along the trackway, lug 91' will swing the hammer out of its path and the cam roller 106' will ride onto the cam face 336 of the cam plate member 314. As the roller 106' follows along the edge or face 336, the box will be swung counterclockwise on the shaft 81, lifting it free from the completed core which remains in the drier 134. As the roller 106' rides into the groove 340, the box will come to vertical position and will be carried over center and be supported on the cam face 338 as the roller 106' rides down the same to the point 341 at the end of the cam face. The box and drier will now again be in horizontal, laterally adjacent position, as shown in Fig. 9, with the completely formed core in the drier. It is to be noted that as the box was swung through the return stroke of substantially 180° of its oscillation, that the drier remained in horizontal position. The truck has now arrived at station A and the operator removes the drier and completed core and places an empty drier on the platform 82 of the truck. This completes a cycle of operation of the apparatus.

What I claim and desire to secure by Letters Patent of the United States is:—

1. An apparatus of the character described, comprising a supporting base, mold sections having operating means and laterally positioned on said base and normally supported thereby in substantially horizontal position, said sections being movable into substantially vertical booked relation, cam means adapted to engage said operating means and being operable to move said sections by cam action into booked relation, and means to cause engagement between said operating means and said cam means to book said sections.

2. An apparatus of the character described, comprising a supporting base, mold sections having operating means and laterally positioned on said base and normally supported thereby in substantially horizontal position, said sections being pivotally supported for swinging movement into substantially vertical booked relation, cam means adapted to engage said operating means and being operable to move said sections by cam action into booked relation, and means to cause engagement between said operating means and said cam means to book said sections.

3. An apparatus of the character described, comprising a supporting base, frame members laterally positioned on said base, said frame members being pivotally supported on said base at their adjacent edges for movement into substantially vertical parallel opposed relation, mold sections having complementary faces adapted for engagement, said sections being positioned on said frame members, means to move said frame members into opposed relation, and compensating means acting automatically as the sections are moved into engagement to permit the faces of said mold sections to engage should the combined depth of said mold sections be greater than normal.

4. An apparatus of the character described, comprising a supporting base, frame members laterally positioned on said base, said frame members being pivotally supported on said base at their adjacent edges for movement into substantially vertical parallel opposed relation, mold sections having complementary faces adapted for engagement, said sections being laterally positioned and pivotally mounted on said frame members for oscillation on substantially horizontal parallel axes whereby said sections may engage each other throughout the widths of their faces, and means to move said frame members into opposed relation.

5. An apparatus of the character described, comprising a movable supporting base, mold sections laterally positioned on said base and normally supported thereby in substantially horizontal position, said sections being movable into substantially vertical booked relation, operating means carried by each section, means adapted to substantially simultaneously engage said operating means to move said sections into booked relation, and means to move said base to cause said last-named means to engage said operating means thereby to book said sections.

6. An apparatus of the character described, comprising a supporting base, section members pivoted on said supporting base at their adjacent edges, cam means adapted to swing one of said members through an oscillation of substantially 360° and to swing the other of said members through an oscillation of substantially 180°, the rates of movement of said members being substantially equal, the initial stroke of the oscillation of one member and the initial half stroke of the oscillation of the other member moving said members into substantially parallel abutting relation, and means to cause relative movement between said base and said cam means whereby said cam means acts on said members to swing said members through their respective oscillations on said base.

7. An apparatus of the character described, comprising a movable supporting base, plate members pivotally supported on said base at their adjacent edges, said members being normally positioned laterally of each other in substantially horizontal position, cam means adapted to engage said members to move said members on their pivots into substantially parallel vertical opposed relation, then to move said members while in such opposed relation into substantially horizontal superposed relation, and then to move the topmost member into original lateral relation to said other member, operating means on said plate members to engage said cam means, and means to move said supporting base to cause said operating means to engage said cam means whereby said cam means will move said members.

8. An apparatus of the character described, comprising a supporting base, mold sections positioned on said base in lateral spaced relation, said sections being pivoted together and to said base for movement into booking relation, substantially arcuate cam plate members spaced apart and curving upwardly toward each other, the forward edges of said members being inclined upwardly and longitudinally of said members, the inclination of said forward edges being equal and terminating at equal heights to form a cam slot of gradually decreasing width, each of said sections having an operating member adapted to engage one of the edges of said cam slot, means to cause relative movement between said cam plate members and said base whereby said operating members enter and pass along said cam slot to cause said mold sections to be booked and means cooperable with said base member to prevent vertical movement thereof as said mold sections are booked.

9. An apparatus of the character described, comprising a supporting base, mold sections positioned on said base in lateral spaced relation, said sections being pivoted together and to said base for movement into booking relation, substantially arcuate cam plate members spaced apart and curving upwardly toward each other, means interconnecting and resiliently holding said members in spaced relation, the forward edges of said members being inclined upwardly and longitudinally of said members, the inclination of said forward edges being equal and terminating at equal heights to form a cam slot of gradually decreasing width, each of said sections having an operating member adapted to engage one of the edges of said cam slot, and means to cause relative movement between said cam plate members and said base whereby said operating members enter and pass along said cam slot to cause said mold sections to be booked.

10. An apparatus of the character described, comprising a trackway, a car adapted to travel on said trackway, means to propel said car along said trackway, plate members positioned on said car in laterally spaced relation and pivoted at their adjacent edges to said car, cam means overlying said trackway and adapted to engage said members to move said members into substantially parallel vertical opposed relation, then to move said members while in such opposed relation into substantially horizontal superposed relation, and then to move the topmost member into original lateral spaced relation to said other member, and means on said plate members to engage said cam means whereby said cam means will move said members.

11. An apparatus of the character described, comprising a trackway, a car adapted to travel on said trackway, means to propel said car along said trackway, plate members laterally and substantially horizontally positioned on said car, said plate members being pivotally supported on said car along its longitudinal center line, and cam means overlying said trackway, said cam means having cam faces, said plate members having means adapted to engage said cam faces as said car is propelled along said trackway whereby each of said plate members is swung into substantially vertical position, then said members are swung in relatively fixed relation into substantially horizontal superposed relation at one side of said car, and then the topmost of said members is swung from superposed position through vertical position to its original substantially horizontal position at the other side of said car.

12. An apparatus of the character described, comprising a substantially horizontal endless trackway, a car adapted to travel on said trackway, means to propel said car along said trackway, mold sections positioned on said car in lateral spaced relation, said sections being pivoted together and to said car substantially on the longitudinal center line of said car, and a substantially semi-cylindrical cam plate overlying said trackway having its longitudinal edges secured adjacent to and laterally spaced from said trackway, said cam plate having a cam guide slot, said sections having cam rollers adapted to engage the sides of said slot and be guided thereby whereby said sections are booked and separated as said car is propelled through said semi-cylindrical cam plate.

13. An apparatus of the character described, comprising a trackway, a car adapted to travel on said trackway, means to propel said car along said trackway, mold sections positioned on said car in lateral spaced relation, said sections being pivoted together and to said car substantially on the longitudinal center line of said car, adjustable means on the car and positioned laterally of said center line for supporting said sections in substantially horizontal position, and substantially arcuate cam plate members positioned laterally adjacent each side of said trackway, said cam plate members extending upwardly over said trackway, the forward edge of each cam plate member being substantially equally inclined upwardly and longitudinally of the trackway, the inclination of the edges terminating at points equidistant above said trackway, said sections having cam rollers respectively adapted to engage the inclined edges of said cam plates upon movement of said car along the trackway whereby said sections are swung upwardly toward each other into booked relation.

14. An apparatus of the character described, comprising a trackway, a car adapted to travel on said trackway, means to propel said car along said trackway, mold sections positioned on said car in lateral spaced relation, said sections being pivoted together and to said car substantially on the longitudinal center line of said car, a substantially semi-cylindrical cam plate overlying said trackway having its longitudinal edges pivotally secured adjacent to and laterally spaced from said trackway, said cam plate having a cam guide slot, said sections having cam rollers adapted to engage the sides of said slot and be guided thereby whereby said sections are booked and separated as said car is propelled through said semi-cylindrical cam plate, and safety means normally maintaining said slot of a predetermined width and operative to prevent injury to said plate when engaged by said rollers.

15. An apparatus of the character described, comprising a trackway, a car adapted to travel on said trackway, mold sections laterally and substantially horizontally positioned on said car and pivoted thereto along their adjacent edges, said sections each having an operating member, means extending along one side of said trackway to engage one of said operating members to swing its section counterclockwise through vertical position, means extending along the other side of said trackway to engage the operating member of the other of said sections to swing said other section clockwise to substantially vertical position and return said other section to its original substantially horizontal position, said sections being swung substantially simultaneously and at substantially equal rates whereby said sections engage each other in substantially vertical position and move together in fixed relative position to the original substantially horizontal position of said other section, means along said other side of said trackway to engage the operating member of said first-named section to swing said first-named section clockwise through vertical position, and means along the first side of said trackway to engage said first operating member at substantially vertical position to swing said first section to its original lateral, substantially horizontal position.

16. An apparatus of the character described, comprising an endless trackway, a car on said trackway, an endless drive means extending along said trackway, means connecting said drive means and said car to propel said car, laterally adjacent plate members supported on said car, said plate members being pivoted at their adjacent edges for clockwise and counterclockwise swing respectively into substantially parallel relation in a substantially vertical plane, mold sections supported one on each of said plate members, means overlying said trackway to clean said sections, means actuated by car travel to operate said cleaning means, means to feed material to be molded to said sections, means operated by car travel to operate said feeding means, means to pack the material in said sections, means to remove surplus material from said sections, means driven by said car to form a groove in the material contained in said sections, means carried by said car to initiate movement of said groove forming means at a predetermined time, means adapted first to raise the substantially horizontal sections into abutting relation, then to move said sections into substantially horizontal superposed relation and then to move the uppermost of said sections into original substantially horizontal position, means on said plate members cooperating with said raising and moving means to move said plate members and mold sections, means adapted to vibrate said sections when in superposed relation, and means actuated by car travel to operate said vibrating means.

17. An apparatus of the character described, comprising a supporting means having a material receiving recess, means adapted to fill said recess with material and actuated automatically upon relative movement between said supporting means and said filling means, means to actuate said filling means when said recess is in material receiving position and to stop said filling means when said recess passes out of material receiving position, means adapted to press the material into said recess upon relative movement between said supporting means and said pressing means, means adapted to remove excess of material from said supporting means upon relative movement between said supporting means and said removing means, and means to cause relative movement between the supporting means and the filling means, pressing means, and removing means.

18. An apparatus of the character described, comprising a supporting means having a material receiving recess, means adapted to fill said recess with material upon relative movement between said supporting means and said filling means, means adapted to press the material into said recess upon relative movement between said supporting means and said pressing means, means to heat said pressing means, means adapted to remove excess of material from said supporting means upon relative movement between said supporting means and said removing means, means to heat said removing means, and means to cause relative movement between the supporting means and the filling means, pressing means, and removing means.

19. An apparatus of the character described, comprising a supporting means having a material receiving recess, means adapted to fill said recess with material and actuated automatically upon relative movement between said supporting means and said filling means, means adapted to press the material into said recess upon relative movement between said supporting means and said pressing means, a plurality of successively acting and pivotally supported means adapted to remove excess of material from said supporting means upon relative movement between said supporting means and said removing means, and means to cause relative movement between the supporting means and the filling means, pressing means, and removing means.

20. An apparatus of the character described, comprising supporting means each having a material receiving recess, means adapted to fill one of said recesses with material upon relative movement between the supporting means therefor and said filling means, means actuated by relative movement between said filling means and a supporting means to start operation of said filling means when said one recess is in material receiving position, means adapted to press the material into said one recess upon relative movement between the same and said pressing means, a plurality of successively acting means adapted to remove excess of material from said one recess upon relative movement between the same and said removing means, and means to cause relative movement between the supporting means having said one recess and the filling means, pressing means, and removing means.

21. An apparatus of the character described, comprising supporting means each having a material receiving recess, means adapted to fill one of said recesses with material upon relative movement between the same and said filling means, means actuated by relative movement between said filing means and a supporting means to cause said filling means to start when said one recess is in material receiving position and to stop when said one recess is out of material receiving position, means adapted to press the material into said one recess upon relative movement between the same and said pressing means, a plurality of successively acting means adapted to remove excess of material from said one recess upon relative movement between the same and said removing means, and means to cause relative movement between the supporting means having said one recess and the filling means, pressing means, and removing means.

22. An apparatus of the character described, comprising supporting means each having a material receiving means electric motor actuated recess, adapted to fill one of said recesses with material upon relative movement between the same and said filling means, automatic means actuated by relative movement between said filling means and a supporting means to energize and de-energize said electric motor means, means adapted to press the material into said one recess upon relative movement between the same and said pressing means, a plurality of successively acting means adapted to remove excess of material from said one recess upon relative movement between the same and said removing means, and means to cause relative movement between the supporting means having said one recess and the filling means, pressing means, and removing means.

23. An apparatus of the character described, comprising a trackway, a car adapted to travel along said trackway, means to propel said car along said trackway, said car having a mold section supported thereon, said section having a mold recess, means overlying said trackway adapted to fill the recess with material to be molded, means overlying said trackway adapted to press the material into said recess, and means overlying said trackway adapted to remove excess of material from said section, said filling means, pressing means, and removing means acting successively and in the sequence named as the car moves said section under said means respectively.

24. An apparatus of the character described, comprising a trackway, a car adapted to travel along said trackway, means to propel said car along said trackway, said car having a mold section supported thereon, said section having a mold recess therein, means overlying said trackway adapted to press material to be molded into said recess, means to remove excess of material from said section, said pressing means and said removing means acting successively as the car moves said section under said means respectively, and means actuated by said car to form a groove in the material contained in said recess.

25. An apparatus of the character described, comprising a trackway, a car adapted to travel along said trackway, means to propel said car along said trackway, said car having a mold section supported thereon, said section having a mold recess therein, means overlying said trackway adapted to press material to be molded into said recess, means to remove excess of material from said section, said pressing means and said removing means acting successively as the car moves said section under said means respectively, and rotary means actuated by engagement with said car to form a groove in the material contained in said recess.

26. An apparatus of the character described, comprising a trackway, a car adapted to travel along said trackway, means to propel said car along said trackway, said car having a mold section supported thereon, said section having a mold recess, means overlying said trackway adapted to fill the recess with material to be molded, means overlying said trackway adapted to press the material into said recess, and means supported above said trackway for substantially universal movement adapted to remove excess of material from said section, said filling means, pressing means, and removing means acting successively as the car moves said section under said means respectively.

27. An apparatus of the character described, comprising a supporting member, lever means pivotally supported on said member, presser means carried by said lever means for pressing material to be molded into the mold recess of a mold section upon relative movement between said presser means and a section, and means acting on said presser means to cause said presser means to exert a predetermined force to press material to be molded into the mold recess of a mold section.

28. An apparatus of the character described, comprising a supporting member, lever means pivotally supported on said member, presser means carried by said lever means for pressing material to be molded into the mold recess of a mold section upon relative movement between said presser means and a section, means acting on said presser means to cause said pressing means to exert a predetermined force to press material to be molded into the mold recess of a mold section, and means to heat said presser means to prevent adherence thereto of material.

29. An apparatus of the character described, comprising a movable supporting base having a mold section mounted thereon, said section having a mold recess adapted to receive material to be molded, and means to form a vent groove in the material contained in said recess, said vent groove forming means being actuated by contact with said base.

30. An apparatus of the character described, comprising a movable supporting base having a mold section mounted thereon, said section having a mold recess adapted to receive material to be molded, a wheel supported above the path of movement of said base, said wheel being journalled on an axis transverse to the path of movement of said base, said wheel having a rib on its cylindrical face adapted to contact the material in said recess to form a groove therein, said wheel being at such a height above said base that the cylindrical face of said wheel will frictionally engage the top face of said mold section whereby said wheel will be rotated by movement of said base thereunder to form a groove in the material in said recess.

31. An apparatus of the character described, comprising a trackway, a car adapted to travel on said trackway, means to propel said car along said trackway, a mold section supported on said car, said section having a mold recess adapted to receive material to be molded, a support, a wheel overlying said trackway and journalled on said support on an axis transverse of said trackway, vent groove forming means on said wheel, said wheel being at such a height above said trackway that the cylindrical face of said wheel will frictionally engage the top face of said section whereby passage of a car beneath said wheel will cause rotation of said wheel to form a vent groove in the material contained in said recess, and means carried by said wheel projecting into the path of movement of said car whereby said car positively initiates rotation of said wheel.

32. An apparatus of the character described, comprising a movable supporting base having a mold section mounted thereon, said section having a mold recess adapted to receive material to be molded, a wheel supported above the path of movement of said base, said wheel being journalled on an axis transverse to the path of movement of said base, said wheel having a rib on its cylindrical face adapted to contact the material in said recess to form a groove therein, means actuated by said car to position said wheel at such a height above said base that the cylindrical face of said wheel will frictionally engage the top face of said mold section whereby said wheel will be rotated by movement of said base thereunder to form a groove in the material in said recess.

33. An apparatus of the character described, comprising a movable supporting base having a mold section mounted thereon, said section having a mold recess adapted to receive material to be molded, a wheel supported above the path of movement of said base, said wheel being journaled on an axis transverse to the path of movement of said base, said wheel having a rib on its cylindrical face adapted to contact the material in said recess to form a groove therein, a bell-crank lever having a pivotal support, one arm of said bell-crank lever having operative connection with said wheel, the other arm of said bell-crank lever extending into the path of movement of said car, whereby said car will engage said other arm to position said wheel at such a height above said base that the cylindrical face of said wheel will frictionally engage the top face of said mold section whereby said wheel will be rotated by movement of said base thereunder to form a groove in the material in said recess.

34. An apparatus of the character described, comprising a movable supporting base having a mold section mounted thereon, said section having a mold recess therein adapted to receive material to be molded, a support adjacent the path of travel of said base, strike means mounted on said support for substantially vertical movement, said strike means being operative to strike excess mold material from the top of said mold section, and means carried by said strike means and cooperative with the top faces of the longitudinal walls of said section to regulate the quantity of excess mold material which will be struck from said section by said strike means.

35. An apparatus of the character described, comprising a movable supporting base having a mold section mounted thereon, said section having a mold recess adapted to receive material to be molded, a support adjacent the path of travel of said base, and strike means comprising a plurality of successively acting plates freely mounted on said support to swing in substantially vertical movement and positioned to strike material from the top of said mold section as said section is moved thereunder.

36. An apparatus of the character described, comprising a movable supporting base having a mold section mounted thereon, said section having a mold recess adapted to receive material to be molded, a support adjacent the path of travel of said base, and strike means universally pivoted on said support and adapted to strike material from the top of said mold section.

37. An apparatus of the character described, comprising a support, a substantially horizontal framework journaled on said support on a substantially horizontal axis, a strike plate, and means pivotally mounting said plate on said framework on an axis transverse to the axis of said framework whereby said plate is universally mounted.

38. An apparatus of the character described, comprising a trackway, a car adapted to travel along said trackway, means to propel said car along said trackway, a mold section carried on said car, means extending over said trackway adapted to clean said section, and car operated means to actuate said cleaning means when said section is beneath said cleaning means.

39. An apparatus of the character described, comprising a trackway, a car having wheels and adapted to travel along said trackway, means to propel said car along said trackway, a mold section carried on said car, means extending over said trackway adapted to clean said section, and operating means in the path of travel of a car wheel for controlling actuation of said cleaning means when said section is beneath said cleaning means.

40. An apparatus of the character described, comprising a trackway, a car adapted to travel along said trackway, means to propel said car along said trackway, a mold section carried on said car, compressed air operated means positioned adjacent the path of travel of the car and adapted to act on said section, and car operated means to cause actuation of said compressed air operated means.

41. An apparatus of the character described, comprising a trackway, a car adapted to travel along said trackway, means to propel said car, a mold section carried by said car, a spray head having a discharge directed over said trackway, and means acting automatically to supply fluid under pressure to said head when said mold section is in line with said discharge.

42. An apparatus of the character described, comprising a trackway, a car adapted to travel along said trackway, means to propel said car along said trackway, a mold section carried on said car, a spray head overlying said trackway, a fluid reservoir adapted to contain fluid and operatively connected to said spray head, a conduit connected to said head adapted to admit fluid under pressure thereto to eject fluid from said reservoir through said head to clean said section, and operating means actuated by travel of a car to admit fluid under pressure to said conduit when said car is beneath said head.

43. An apparatus of the character described for forming cores, comprising a trackway, a carriage movable along said trackway, means to propel the carriage, complementary core box sections movably mounted on the carriage for movement into booked relation and disposed normally in a horizontal position on the carriage, one of said sections being a drier and readily removable from the carriage with the completed core, and means associated with said trackway whereby during travel of said carriage said sections are raised into booked relation and then separated.

44. An apparatus of the character described for forming cores, comprising a trackway, a carriage movable along said trackway, means to propel the carriage, complementary core box sections movably mounted on the carriage for movement into booked relation and disposed normally in horizontal position on the carriage, one of said sections being fixed to said carriage and the other of said sections being readily removable from said carriage, and means associated with said trackway and operable by engagement of said sections therewith to raise said sections into booked relation and then to separate said sections.

45. An apparatus of the character described, comprising a movable supporting base, plate members pivotally supported on said base at their adjacent edges, said members being normally positioned laterally of each other in substantially horizontal position, means adapted to engage said members to move said members on their pivots into substantially parallel opposed relation, then to move said members while in such opposed relation into substantialy horizontal superposed relation, and then to move the topmost member into original lateral relation to said other member, and means to move said supporting base to cause said members to engage said first-named means whereby said first-named means will move said members.

46. An apparatus of the character described, comprising a trackway, a car adapted to travel on said trackway, means to propel said car along said trackway, plate members positioned on said car in laterally spaced relation and pivoted at their adjacent edges to said car, means overlying said trackway and operative to engage said members to move said members into substantially parallel vertical opposed relation, then to move said members while in such opposed relation into substantially horizontal superposed relation, and then to move the topmost member into original lateral spaced relation to said other member.

47. An apparatus of the character described, comprising a trackway, a carriage movable along said trackway, means to propel the carriage, complementary mold sections movably mounted on the carriage and disposed normally in horizontal position on the carriage, means associated with said trackway and operable by engagement of said sections therewith to raise said sections into booked relation and then to separate said sections, and means to vibrate one of said mold sections while said sections are in booked relation.

48. An apparatus of the character described, comprising a trackway, a carriage movable along said trackway, means to propel the carriage, complementary mold sections movably mounted on the carriage and disposed normally in horizontal position on the carriage, means associated with said trackway and operable by engagement of said sections therewith to raise said sections into booked relation and then to separate said sections, means to vibrate one of said mold sections while said sections are in booked relation, and means whereby said vibrating means is controlled by movement of a carriage.

49. An apparatus of the character described, comprising a supporting base, plate members pivotally supported on said base at their adjacent edges, said members being normally positioned laterally of each other in substantially horizontal position, means adapted to engage said members to move said members on their pivots into substantially parallel opposed relation, then to move said members while in such opposed relation into substantially horizontal superposed relation, and then to move the topmost member into original lateral relation to said other member, means to move said supporting base to cause said members to engage said first-named means whereby said first-named means will move said members, and means operable by traveling movement of a supporting base to vibrate one of said members while the members are in superposed relation.

50. An apparatus of the character described, comprising a base having a mold section thereon, said mold section having a mold recess to receive material to be molded, and a rotary device to form a vent groove in the material contained in said recess, said device being adapted for engagement with said section whereby relative movement between said base and device rotates said device to form a vent groove in said material.

51. An apparatus of the character described, comprising a supporting framework, a normally idle wheel rotatively carried by said framework, said wheel having a circumferential groove forming means adapted to form a groove in moldable material and being freely movable vertically with respect to said supporting framework, and means to start rotation of said wheel before engagement of said wheel with said material.

52. An apparatus of the character described, comprising a supporting framework, a normally idle wheel rotatively carried by said framework, said wheel having a circumferential groove forming means adapted to form a groove in moldable material and having its ends freely movable vertically with respect to each other and to said supporting framework, and means to start rotation of said wheel before engagement of said wheel with said material.

53. An apparatus of the character described, comprising a supporting framework, a wheel rotatively carried by said framework, said wheel having a circumferential groove forming means and being freely movable vertically with respect to said supporting framework, and brake means resisting rotation of said wheel.

54. An apparatus of the character described, comprising a supporting member, horizontally spaced pivoted supporting arms carried by said member, each of said arms having in its free end a journal bearing, and a wheel having circumferential groove forming means, and positioned between said arms and having pins journaled in said bearings, said pins being movable upwardly in said bearings whereby the ends of said wheel are movable vertically with respect to each other and to said supporting member.

55. An apparatus of the character described, comprising a supporting member, horizontally spaced pivoted supporting arms movably carried by said member, each of said arms having in its free end a journal bearing, a wheel having circumferential groove forming means positioned between said arms and having pins journaled in said bearings, said pins being movable upwardly in said bearings whereby the ends of said wheel are movable vertically with respect to each other and to said supporting member, and means for adjusting the free ends of said supporting arms with respect to said supporting member.

56. An apparatus of the character described, comprising a hopper for containing finely divided material, a vertical feed chute, conveyor means for delivering material from said hopper to the top of said chute, a supporting means having a material receiving recess and positioned below said chute for receiving material therefrom, said chute and supporting means being relatively movable whereby said recess is traversed by said chute, and means to operate said conveyor means to deliver material to said recess upon relative movement between said supporting means and said chute.

57. An apparatus of the character described, comprising a hopper for containing finely divided material, a vertical feed chute, conveyor means for delivering material from said hopper to the top of said chute, a supporting means having a material receiving recess and positioned below said chute for receiving material therefrom, said chute and supporting means being relatively movable whereby said recess is traversed by said chute, means to operate said conveyor means to deliver material to said recess upon relative movement between said supporting means and said chute, means to remove excess material from said recess, and means to return the removed excess material to said hopper.

58. An apparatus of the character described, comprising a mold section having a recess for receiving material to be molded, supporting means above said section, said section and said means being relatively movable, and a plate member carried by said supporting means and having a portion normally disposed below the top plane of the material received by said section and normally urged downward for pressing engagement with the material to be molded thereby to press the material into said recess.

59. An apparatus of the character described, comprising a mold section having a recess for receiving material to be molded, supporting means above said section, said section and said means being relatively movable, and an inclined plate member carried by said supporting means and normally urged downward for engagement with material to be molded and thereby remove excess material from said section and press the remaining material into said recess.

60. An apparatus of the character described, comprising mold sections having a horizontal booked position, an automatically operated hammer means positioned to strike one of said booked sections, said sections and said hammer means being relatively movable, and means operated as said booked sections take position to be struck by said hammer means to cause operation of said hammer means.

61. An apparatus of the character described, comprising a trackway, a car on said trackway and having mold sections supported thereon, said sections having a horizontal booked position, means to propel said car along said trackway, an automatically operated hammer means having reciprocable striking movement and positioned to strike one of the booked sections as said sections are moved past said hammer means, said hammer means being supported to swing in a horizontal plane to permit movement of said sections into position to be operated upon by said hammer means, means normally maintaining said hammer means in operable position, and car operated means to start and stop said hammer means.

62. An apparatus of the character described, comprising a trackway, a car on said trackway to travel thereon, means to propel said car along said trackway, mold members positioned on said car in lateral relation to each other and pivoted on said car, means associated with the trackway and acting by travelling movement of the car to engage said mold members to move said members into substantially parallel vertical opposed relation, then to move said members while in such opposed relation into substantially horizontal superposed relation, and then to move the topmost member into lateral spaced relation to the lowermost member.

In testimony whereof I have hereunto signed my name.

ELBERT O. HASKINS.

CERTIFICATE OF CORRECTION.

Patent No. 1,794,334.                          Granted February 24, 1931, to

ELBERT O. HASKINS.

It is hereby certified that error appears in the printed specification of the above numbered patent requiring correction as follows: Page 16, line 74, claim 22, for the word "means" read recess, and line 75, for "recess" read means; and that the said Letters Patent should be read with these corrections therein that the same may conform to the record of the case in the Patent Office.

Signed and sealed this 7th day of July, A. D. 1931.

(Seal)                                                               M. J. Moore,
                                                                   Acting Commissioner of Patents.